(12) United States Patent
Kim et al.

(10) Patent No.: US 11,726,301 B2
(45) Date of Patent: Aug. 15, 2023

(54) LENS ASSEMBLY AND ELECTRONIC DEVICE INCLUDING THE SAME

(71) Applicant: Samsung Electronics Co., Ltd., Gyeonggi-do (KR)

(72) Inventors: Hyunjea Kim, Gyeonggi-do (KR); Changkeun Kim, Gyeonggi-do (KR); Hyunho Kim, Gyeonggi-do (KR); Jaecheol Bae, Gyeonggi-do (KR); Kyeongeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 17/065,650

(22) Filed: Oct. 8, 2020

(65) Prior Publication Data

US 2021/0132342 A1 May 6, 2021

(30) Foreign Application Priority Data

Nov. 6, 2019 (KR) .................. 10-2019-0140826

(51) Int. Cl.
*G02B 3/02* (2006.01)
*G02B 13/18* (2006.01)
(Continued)

(52) U.S. Cl.
CPC ......... *G02B 13/0045* (2013.01); *G02B 5/005* (2013.01); *G02B 9/62* (2013.01)

(58) Field of Classification Search
CPC ...... G02B 13/0045; G02B 5/005; G02B 9/62; G02B 9/38; G02B 9/60; G02B 9/64;
(Continued)

(56) References Cited

U.S. PATENT DOCUMENTS

| RE45,765 E | 10/2015 | Tang et al. |
| 9,417,434 B1 | 8/2016 | Huang |

(Continued)

FOREIGN PATENT DOCUMENTS

| JP | 2012-208326 A | 10/2012 |
| JP | 2013-2055808 A | 10/2013 |

(Continued)

OTHER PUBLICATIONS

European Search Report dated Aug. 16, 2022.
International Search Report dated Jan. 15, 2021.

*Primary Examiner* — Mahidere S Sahle
(74) *Attorney, Agent, or Firm* — Cha & Reiter, LLC

(57) ABSTRACT

Disclosed herein is a lens assembly that includes an aperture stop and at least three lenses. The first lens is disposed closer to the image sensor than the aperture stop, the first lens including two convex surfaces. The second lens is disposed closer to the image sensor than the first lens, and includes convex and concave surfaces. And the third lens is disposed closer to the image sensor than the second lens. The lens assembly meets Equation 1:

$$0.1 \le CT15/StopL \le 0.4$$

wherein "CT15" denotes a distance between the object-side surface of the first lens and the object-side surface of the third lens measured along the optical axis, and "StopL" denotes a distance between an image forming surface of the image sensor and the aperture stop measured along the optical axis. Other various embodiments are also disclosed.

19 Claims, 16 Drawing Sheets

(51) Int. Cl.
    *G02B 13/00*    (2006.01)
    *G02B 9/62*     (2006.01)
    *G02B 5/00*     (2006.01)

(58) Field of Classification Search
    CPC ... G02B 9/12; G02B 9/16; G02B 9/34; G02B 13/0035; G02B 13/004; G02B 13/02
    USPC ........ 359/713–716, 739, 740, 745–748, 756, 359/757, 763, 764, 771, 772, 784, 785
    See application file for complete search history.

(56)  References Cited

U.S. PATENT DOCUMENTS

| | | | |
|---|---|---|---|
| 9,726,857 B2 * | 8/2017 | Chen | G02B 13/0045 |
| 9,927,598 B2 | 3/2018 | Huang | |
| 2007/0242370 A1 | 10/2007 | Fukuta et al. | |
| 2012/0250167 A1 | 10/2012 | Hashimoto | |
| 2015/0049165 A1 | 2/2015 | Choi | |
| 2018/0059378 A1 * | 3/2018 | Kubota | G02B 13/0045 |
| 2019/0033556 A1 | 1/2019 | Tang et al. | |

FOREIGN PATENT DOCUMENTS

| | | |
|---|---|---|
| JP | 2014-232147 A | 12/2014 |
| JP | 2018-036316 A | 3/2018 |
| JP | 2019-56946 A | 4/2019 |
| JP | 2019-056946 A | 4/2019 |
| KR | 10-2007-0101776 A | 10/2007 |
| KR | 10-1462351 B1 | 11/2014 |

* cited by examiner

LENS ASSEMBLY AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2019-0140826, filed on Nov. 6, 2019, in the Korean Intellectual Property Office, the disclosure of which is herein incorporated by reference in its entirety.

BACKGROUND

Field

One or more embodiments of the instant disclosure generally relate to optical devices, e.g., lens assemblies and/or electronic devices including the lens assemblies.

Description of Related Art

Optical devices, for example, cameras capable of capturing images or videos have been widely used, and digital cameras or video recorders with digital image sensors such as a charge coupled device (CCD) or complementary metal-oxide semiconductor (CMOS) have become commonplace. As optical technology has gradually developed, image sensors or image sensor-equipped lens assemblies are being miniaturized and implemented in portable electronic devices, such as mobile communication terminals or smart phones, so that the electronic device may have a camera function. The lens assembly equipped in the portable electronic device may be used to implement various functions, such as user authentication or augmented reality, as well as image capturing or video recording.

As the use of portable electronic devices becomes commonplace, users' needs for the electronic devices include portability, aesthetically pleasing appearance, and optimized operational performance. However, portability and appearance may compromise the performance of electronic device. For example, high-performance, large-screen displays may output high-definition screens but suffer from poor portability. As another example, as displays output larger screens with higher performance, the control circuitry may be more complicated or consume more power.

SUMMARY

According to an embodiment, as the opening area through which light is incident from the outside onto the lens assembly increases, the lens assembly may obtain images or video with better quality. However, the opening area is exposed to the outside of the electronic device, and a larger size of the opening area may deteriorate the appearance of the electronic device or may limit how the device can be designed. For example, a lens assembly with a larger opening area may obtain images with better quality but may cause the electronic device to look ugly.

According to another embodiment, an electronic device may include a lens assembly for user authentication (e.g., iris or face recognition), video calls, or selfie taking. The lens assembly may be, at least, partially exposed from the front surface of the electronic device, reducing the active area of the display relative to the whole area of the electronic device. For example, when the lens assembly is installed to be able to capture what is in front of the electronic device, the display size relative to the actual size of the electronic device, which the user may find to be more important, may be reduced.

In accordance with an embodiment, a lens assembly or an electronic device including the lens assembly comprises an aperture stop and at least three lenses sequentially arranged from a side of an object to a side of an image sensor along an optical axis. A first lens disposed on the side of the object among the at least three lenses is disposed closer to the image sensor than the aperture stop, the first lens including a convex surface on the side of the object and a concave surface on the side of the image sensor, and the first lens having positive refractive power. A second lens among the at least three lenses is disposed closer to the image sensor than the first lens, the second lens includes a convex surface on the side of the object and a concave surface on the side of the image sensor, and the second lens having negative refractive power. A third lens among the at least three lenses is disposed closer to the image sensor than the second lens and has positive or negative refractive power. The lens assembly meets Equation 1:

$$0.1 = < CT15/\text{Stop}L = < 0.4 \qquad \text{Equation 1}$$

where "CT15" denotes a distance between the object-side convex surface of the first lens and the object-side convex surface of the third lens measured along the optical axis, and "StopL" denotes a distance between an image forming surface of the image sensor and the aperture stop measured along the optical axis.

In accordance with an embodiment, a lens assembly or an electronic device including the lens assembly comprises an aperture stop and at least three lenses sequentially arranged from a side of an object to a side of an image sensor along an optical axis. A first lens disposed on the side of the object among the at least three lenses is disposed closer to the image sensor than the aperture stop, the first lens including a convex surface on the side of the object and a concave surface on the side of the image sensor, and the first lens having positive refractive power. A second lens among the at least three lenses is disposed closer to the image sensor than the first lens, the second lens includes a convex surface on the side of the object and a concave surface on the side of the image sensor, and the second lens having negative refractive power. A third lens among the at least three lenses is disposed closer to the image sensor than the second lens and has positive or negative refractive power. The lens assembly meets Equation 2:

$$0.3 = < ED3/TL = < 0.45 \qquad \text{Equation 2}$$

where "ED3" denotes an effective diameter of the third lens, and "TL" denotes a distance between an image forming surface of the image sensor and the object-side convex surface of the first lens measured along the optical axis.

In accordance with an embodiment, an electronic device comprises a display including a light transmission area surrounded by an active area as viewed from above a front surface of the electronic device and the above-described lens assembly disposed to at least partially overlap the display. The lens assembly is configured to generate an image signal based on light incident via the light transmission area.

Additional aspects will be set forth in part in the description which follows and, in part, will be apparent from the description, or may be learned by practice of the presented embodiments.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
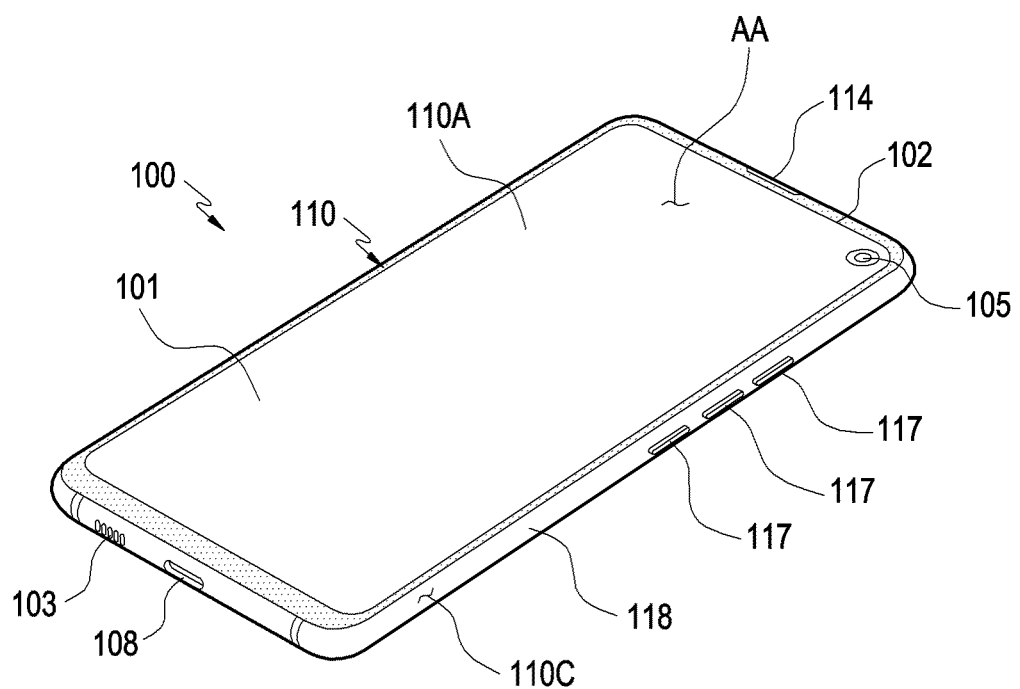
FIG. 1 is a perspective view illustrating an electronic device according to an embodiment.

According to certain embodiments, there may be provided a lens assembly with a smaller opening area formed in a portion of the display to allow light to be incident from the outside of the electronic device to the image sensor inside the electronic device. An electronic device including the lens assembly is also provided.

According to certain embodiments, there may be provided a lens assembly with a miniaturized opening area, through which light is incident. The lens assembly is still capable of obtaining high-quality images. An electronic device including the lens assembly is also provided.

As the disclosure allows for various changes and numerous embodiments, various example embodiments will be described in greater detail with reference to the accompanying drawings. However, it should be understood that the disclosure is not limited to the specific embodiments, and that the disclosure includes all modifications, equivalents, and alternatives within the spirit and the scope of the disclosure.

With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Although ordinal terms such as "first" and "second" may be used to describe various elements, these elements are not limited by the terms. The terms are used merely to distinguish an element from the other elements. For example, a first element could be termed a second element, and similarly, a second element could be also termed a first element without departing from the scope of the disclosure. As used herein, the term "and/or" includes any and all combinations of one or more associated items. It is to be understood that if an element (e.g., a first element) is referred to, with or without the term "operatively" or "communicatively", as "coupled with," or "connected with,", the element may be coupled with the other element directly (e.g., wiredly), wirelessly, or via a third element.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily.

In the disclosure, the terms are used to describe specific embodiments, and are not intended to limit the disclosure. As used herein, the singular forms are intended to include the plural forms as well, unless the context clearly indicates otherwise. In the disclosure, the terms such as "include" and/or "have" may be understood to denote a certain characteristic, number, step, operation, constituent element, component or a combination thereof, but may not be construed to exclude the existence of or a possibility of addition of one or more other characteristics, numbers, steps, operations, elements, components or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

In the disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may, for example, and without limitation, be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device. However, the disclosure is not limited thereto.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 2:
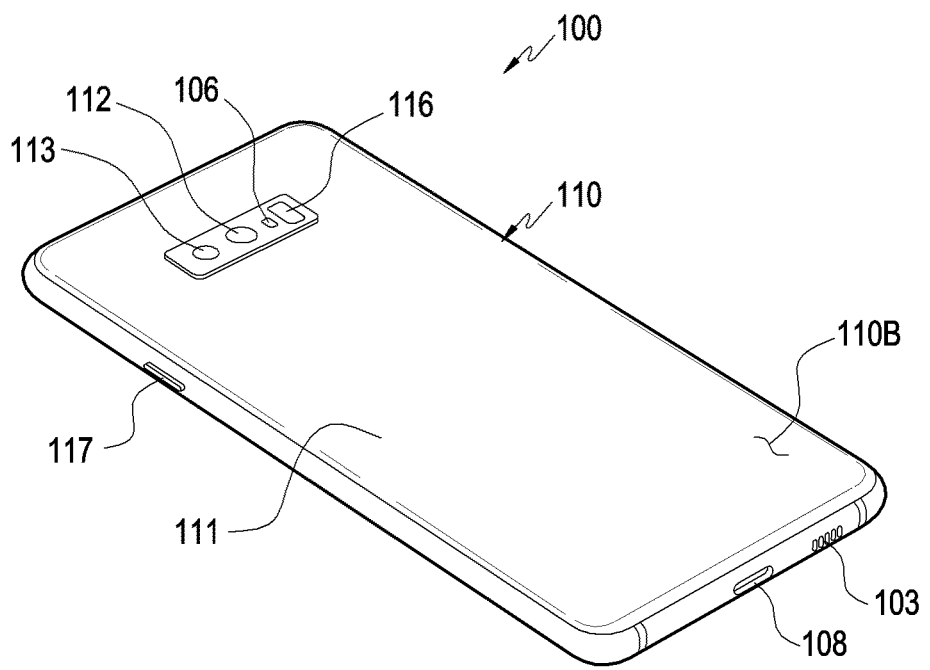
FIG. 2 is a rear perspective view illustrating the electronic device of FIG. 1.

FIG. 1 is a perspective view illustrating an electronic device 100 according to an embodiment. FIG. 2 is a rear perspective view illustrating the electronic device 100 of FIG. 1.

Referring to FIGS. 1 and 2, according to an embodiment, an electronic device 100 may include a housing 110 with a first (or front) surface 110A, a second (or rear) surface 110B, and a side surface (or side wall) 110C surrounding a space between the first surface 110A and the second surface 110B. According to another embodiment (not shown), the housing 110 may denote a structure forming part of the first surface 110A, the second surface 110B, and the side surface 110C of FIG. 1.

According to an embodiment, at least part of the first surface 110A may have a substantially transparent front plate 102 (e.g., a glass plate or polymer plate including various coat layers). According to an embodiment, the front plate 102 may include a curved portion that is bent from the first surface 110A toward the rear surface 111 at least one side edge portion and seamlessly extends therefrom.

According to an embodiment, the second surface 110B may be formed of a substantially opaque rear plate 111. The rear plate 111 may be made of, e.g., laminated or colored glass, ceramic, polymer, metal (e.g., aluminum, stainless steel (STS), or magnesium), or a combination of at least two thereof. According to an embodiment, the rear plate 111 may include a curved portion that is bent from the second surface 110B toward the front surface 102 at at least one side edge portion and seamlessly extends therefrom.

According to an embodiment, the side surface 110C may be formed by a side surface structure (or a "side member" or "side wall") 118 that couples to the front plate 102 and the rear plate 111 and includes metal and/or polymer. According to an embodiment, the rear plate 111 and the side surface structure 118 may be integrally formed together and include the same material (e.g., a metal, such as aluminum).

According to an embodiment, the electronic device 100 may include at least one or more of a display 101, audio modules 103 and 114, a sensor module, an opening area 105 (e.g., a light transmission area), a key input device 117, and a connector hole 108. According to an embodiment, the electronic device 100 may embed an optical module (e.g., the camera module 206 of FIG. 3, a light source, a proximity sensor, or an illuminance sensor) in an area corresponding to the opening area 105. According to an embodiment, the electronic device 100 may exclude at least one (e.g., the key input device 117) of the components or may add other components. For example, the electronic device 100 may include another sensor module (not shown). For example, in the area provided by the front plate 102, a proximity sensor or illuminance sensor may be integrated in the display 101 or be disposed in a position adjacent to the display 101. According to an embodiment, the electronic device 100 may further include a light emitting element, and the light emitting element may be disposed in a position adjacent to the display 101 in the area provided by the front plate 102. The light emitting element may optically provide, e.g., information about the state of the electronic device 100 (e.g. flashing light to indicate receipt of a message). According to an embodiment, the light emitting element may provide a light source (e.g. a flash) that interworks with the operation of the optical module (e.g., camera module) disposed in the opening area 105. The light emitting element may include, e.g., a light emitting device (LED), an infrared (IR) LED, and/or a xenon lamp.

The display 101 may be exposed through the top of, e.g., the front plate 102. According to an embodiment, the edge of the display 101 may be formed to be substantially the same in shape as the corresponding adjacent outer edge of the front plate 102. According to an embodiment (not shown), the interval between the outer edge of the display 101 and the outer edge of the front plate 102 may remain substantially even to maximize the exposure of the display 101. For example, as viewed from above the front plate 102, the active area AA of the display 101 may substantially form a front surface (e.g., the first surface 110A) of the electronic device 100, and the size of the active area AA may be 90% or more, substantially 100%, of the size of the first surface 110A. According to an embodiment, an edge portion of the first surface 110A of the electronic device may be an area (e.g., a black matrix area) that outputs no screen. According to an embodiment, a recess (e.g., a notch area) or an opening (e.g., the opening area 105) may be formed in a portion of the screen display area AA of the display 101, and other electronic components, e.g., a camera module (e.g., the camera module 206 of FIG. 3), proximity sensor, or illuminance sensor (not shown) may be aligned with the recess or the opening (e.g., the opening area 105). According to an embodiment, at least one or more of the camera module 112 or 113, the fingerprint sensor 116, and the flash 106 may be included on the rear surface of the active area AA of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen.

The audio modules 103 and 114 may include a microphone hole and a speaker hole. The microphone hole may have a microphone inside to obtain external sounds. According to an embodiment, there may be a plurality of microphones to be able to detect the direction of the sound. According to an embodiment, the speaker hole and the microphone hole may be implemented as a single hole 103, or the speaker may be included without the speaker hole (e.g., when the speaker is a piezo speaker). The speaker holes may include an external speaker hole and a phone receiver hole 114.

The electronic device 100 may include a sensor module (not shown) and may thus produce an electrical signal or data value corresponding to the internal operation state or external environment state of the electronic device. The sensor modules may include a proximity sensor disposed on the first surface 110A of the housing 110, a fingerprint sensor integrated with, or disposed adjacent to, the display 101, and/or a biometric sensor (e.g., a heartrate monitor (HRM) sensor) disposed on the second surface 110B of the housing 110. The electronic device 100 may further include other sensor modules (not shown), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 112, 113, and 106 may include a first camera device (e.g., a camera module disposed corresponding to the opening area 105) disposed on the first surface 110A of the electronic device 100 and a second camera device 112 and 113 and a flash 106 disposed on the second surface 110B. The camera modules 112 and 113 may each include one or more lenses, an image sensor, and/or an image signal processor. The flash 106 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include at least a portion of the fingerprint sensor 116 shown in FIG. 2 as being disposed on the second surface 110B of the housing 110.

The connector hole 108 may receive a connector for transmitting and receiving power and/or data to/from an external electronic device and/or a connector for transmitting and receiving audio signals to/from an external electronic device. For example, the connector hole 108 may include a universal serial bus (USB) connector or an earphone jack.

Figure 3:
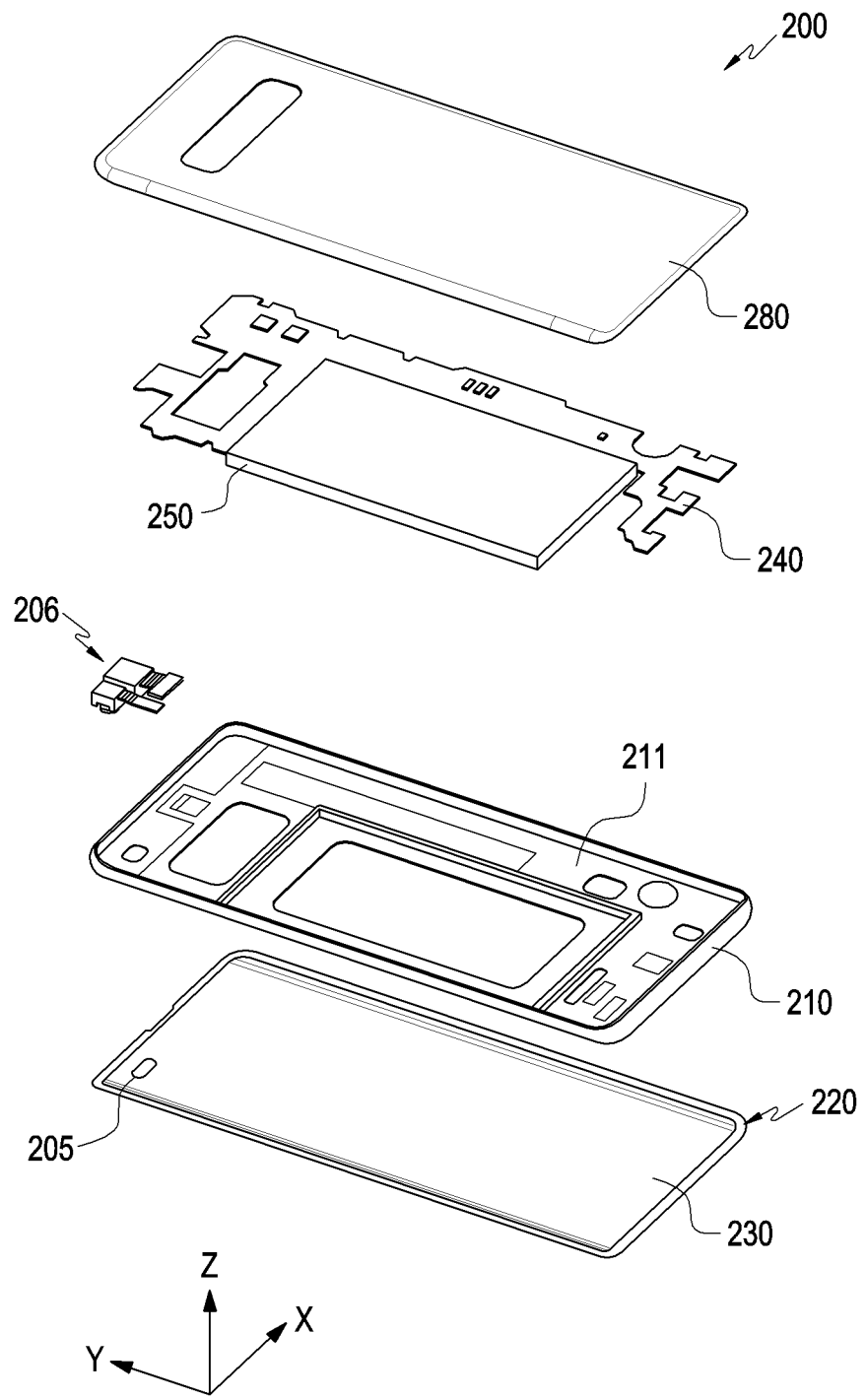
FIG. 3 is an exploded perspective view illustrating an electronic device according to an embodiment.

FIG. 3 is an exploded perspective view illustrating an electronic device 200 (e.g., the electronic device 100 of FIG. 1) according to an embodiment.

Referring to FIG. 3, the electronic device 200 may include a side surface structure 210 (e.g., the side surface structure 118 of FIG. 1), a middle plate, e.g., a first supporting plate 211 (e.g., a bracket), a front plate 220 (e.g., the front plate 102 of FIG. 1), a display 230 (e.g., the display 101 of FIG. 1), a printed circuit board 240, a battery 250, and a rear plate 280. According to an embodiment, the display 230 may be disposed between the front plate 220 and the rear plate 280. The printed circuit board 240 in the thickness direction Z of the electronic device 200 may be disposed behind the display 230 (e.g., between the display 230 and the rear plate 280). According to an embodiment, the first supporting member 211 may be disposed between the display 230 and the printed circuit board 240 to provide electromagnetic isolation between the display 230 and the printed circuit board 240. According to an embodiment, the electronic device 200 may exclude at least one (e.g., the first supporting member 211) of the components or may add other components. Some of the components of the electronic device 200 may be the same or similar to the corresponding components of the electronic device 100 of FIG. 1 or 2 and no duplicate description is made below.

According to an embodiment, as viewed from above the front plate 220, the opening area 205 (e.g., the opening area 105 of FIG. 1) formed in the display 230 may be shaped as an elongated hole extending in the width direction X of the electronic device 200. In certain embodiments, the term "opening area" may refer to an area formed by a hole passing through the display 230 (e.g., the display 101 of FIG. 1) in the active area AA of the display. In some embodiments, the term "opening area" may refer to a transparent area surrounded by the active area AA and lacking pixels therein. For example, the opening area 205 may be made of a material that blocks fluidic communication between the outside of the front plate 220 and the inside but may allow light to come from the outside of the front plate 220 to the inside, i.e. the opening area 205 may be transparent. According to an embodiment, the opening area 205 may provide a path along which light travels from the inside of the front plate 220 to the outside. In some embodiments, the term "opening area" may refer to an area with a lower pixel array density as compared with the other areas of the display.

The first supporting member 211 may be disposed inside the electronic device 200 to be connected with the side surface structure 210 or integrated with the side surface structure 210. The first supporting member 211 may be made of, e.g., metal and/or non-metallic material (e.g., polymer). The display 230 may be joined onto one surface of the first supporting member 211, and the printed circuit board 240 may be joined onto the opposite surface of the first supporting member 311. A processor, memory, and/or interface may be mounted on the printed circuit board 240. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

The battery 250 may be a device for supplying power to at least one component of the electronic device 200. The battery 189 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

According to an embodiment, the electronic device 200 may include an optical module, e.g., the camera module 206. The camera module 206 may be mounted and fixed to the side surface structure 210 or the first supporting member 211 and be electrically connected with the circuit board 240. According to an embodiment, the camera module 206 may be disposed corresponding to a light transmission area, e.g., the opening area 205, of the display 230. For example, as viewed from outside of the electronic device, the camera module 206 may be disposed to at least partially overlap the display 230 and may detect the light incident through the opening area 205. According to an embodiment, the camera module 206 may be disposed under the opening area 205 (e.g., in the Z axis direction of FIG. 3) to obtain at least part of the light from the outside of the electronic device via the opening area 205. According to an embodiment, when the circuit board 240 or the camera module 206 is equipped with an image signal processor, the circuit board 240 or the camera module 206 may generate an image signal or obtain an image based on the detected light.

In describing the following embodiments, the components similar to those in the above embodiments or can be readily understood from the description of the above embodiments are denoted with or without the same reference numerals and their detailed description may be skipped. In describing the following embodiments, the figures or configurations related to the above-described embodiments may be referenced, and for brevity duplicative description thereof may be omitted.

Figure 4:
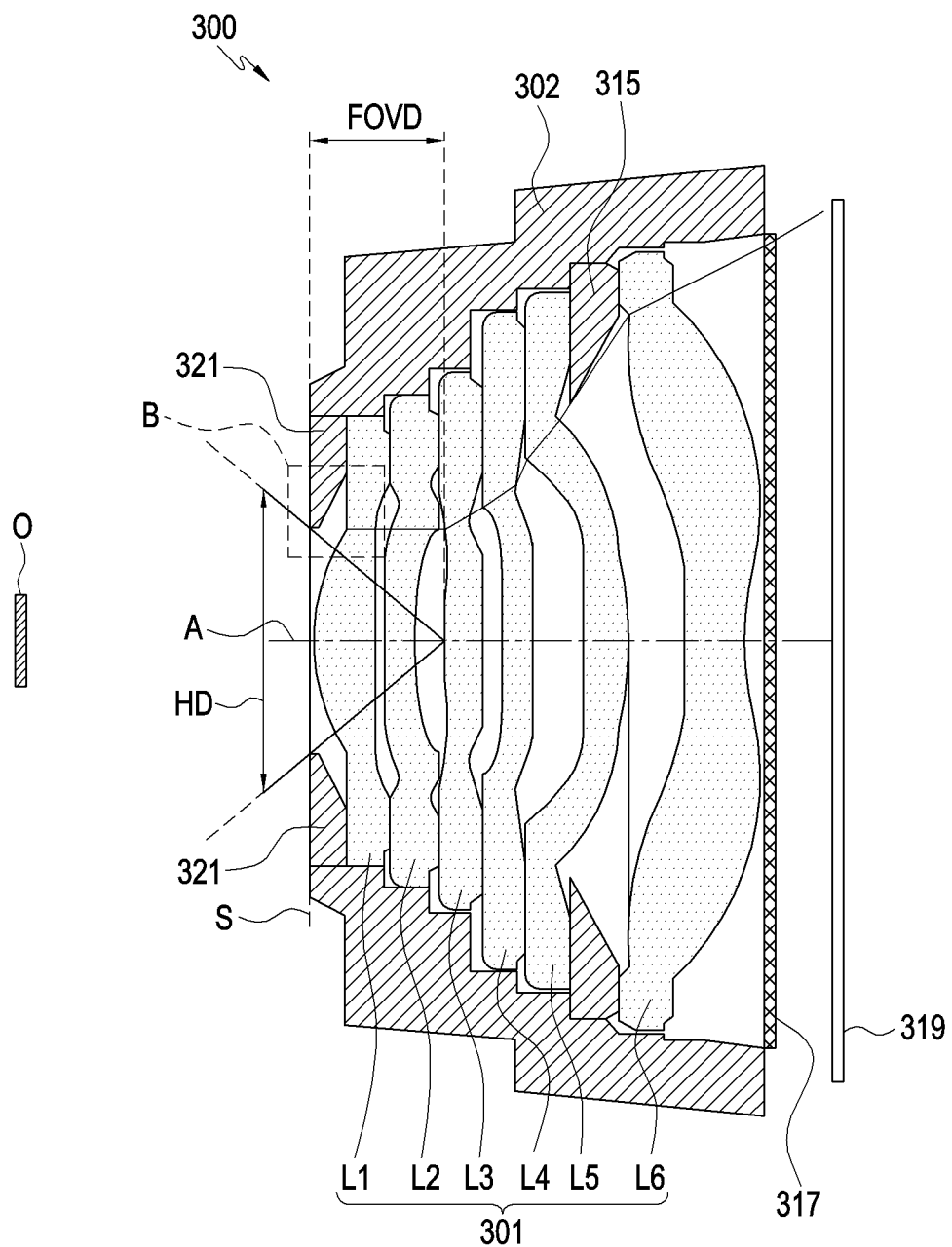
FIG. 4 is a cross-sectional view illustrating a lens assembly according to an embodiment.
Figure 5:
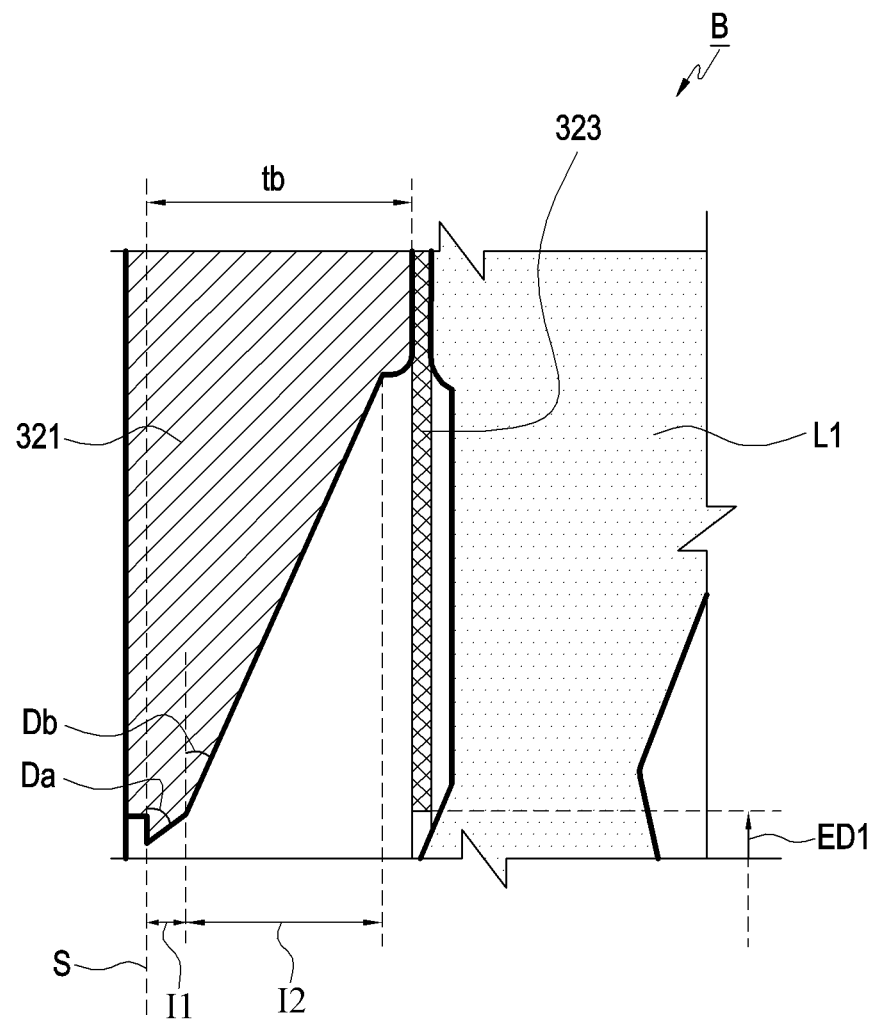
FIG. 5 is an enlarged view of portion 'B' of FIG. 4.

FIG. 4 is a cross-sectional view illustrating a lens assembly 300 (e.g., in the camera module 206 of FIG. 3) according to an embodiment. FIG. 5 is an enlarged view of portion 'B' of FIG. 4.

Referring to FIGS. 4 and 5, the lens assembly 300 may include a plurality of lenses 301, L1, L2, L3, L4, L5, and L6 sequentially arranged along the direction of the optical axis A between the aperture stop S and the image sensor 319. According to an embodiment, among the lenses 301, a first lens L1 may be disposed between the aperture stop S and the image sensor 319 and may be disposed closer to an object O (e.g., on the side of the object O) than the other lenses. Among the lenses 301, a second lens L2 may be disposed between the first lens L1 and the image sensor 319, and a third lens L3 may be disposed between the second lens L2 and the image sensor 319. According to an embodiment, the lens assembly 300 may further include a fourth lens L4, a fifth lens L5, and a sixth lens L6 sequentially disposed between the third lens L3 and the image sensor 319. According to an embodiment, an additional lens may be disposed between the sixth lens L6 and the image sensor 319. According to an embodiment, a filter 317 (e.g., an infrared (IR) filter) may be further disposed between the lens (e.g., the sixth lens L6) closest to the image sensor 319 and the image sensor 319. According to an embodiment, a micro lens layer (not shown) may be further formed on the image sensor 319. The structure in which the plurality of lenses or the filter are formed is not limited to that described above, and additional lenses or filters may be included, and at least one of the plurality of lenses may be omitted.

According to an embodiment, the aperture stop S may be a virtual plane or flat surface formed or defined by a structure including an aperture and a shutting portion and may be a virtual plane or flat surface including an aperture through which light is incident. For example, the shutting portion may adjust the size of the aperture such that the physical quantity of the light entering the lens is adjusted, and the aperture stop S may mean a virtual plane or flat surface including such an aperture. According to an embodiment, as the area of the shutting portion enlarges, the aperture gets smaller, decreasing the physical quantity of the light entering the lens. As the area of the shutting portion shrinks, the aperture gets bigger, increasing the quantity of the light entering the lens. For example, the aperture stop S may be implemented by a structure that may determine the amount of light entering the lens or the valid diameter of the lens. According to an embodiment, in the aperture stop S, the aperture through which light is incident and the shutting portion defining the aperture may be defined by a portion of a barrel 302. According to an embodiment, the shutting portion of the aperture stop S may be defined by another structure disposed in the barrel 302. For ease of description only, in the following embodiments, the aperture or shutting portion of the aperture stop S may be described as a component separate from the barrel 302.

According to an embodiment, the aperture stop S may be a structure that is positioned closer to the object O than the first lens L1, and is assembled or mounted on the barrel 302. In this case, a portion of the barrel 302 positioned between the aperture stop S and the first lens L1 may be denoted as a "barrel structure 321." According to an embodiment, the aperture stop S may be a structure received inside the barrel 302. For example, in the following detailed description, the aperture stop S may be a component or part including a portion of the outer circumferential surface of the barrel 302 facing the object O when images of the object O are captured or a component or part positioned between the outer circumferential surface of the barrel 302 and the first lens L1. However, embodiments of the disclosure are not limited thereto but may rather be defined in other various manners depending on the structure of the lens assembly actually manufactured.

According to an embodiment, as viewed from the outside of the electronic device, the lens assembly 300 may be disposed to at least partially overlap the display (e.g., the display 101 or 230 of FIG. 1 or 3) and may substantially receive the light incident through a light transmission area, e.g., the opening area 105 or 205 of FIG. 1 or 3. According to an embodiment, as the aperture stop S is disposed closer to the object O than the first lens L1, the light transmission area (e.g., the diameter HD of the opening area) may be minimized. For example, as the aperture stop S is disposed closer to the object O than the first lens L1, the lens assembly 300 may be disposed to overlap the display, and the proportion of the light transmission area (e.g., the opening area 105 or 205 of FIG. 1 or 3) in the front surface of the electronic device (e.g., the electronic device 200 of FIG. 1 or 3) may be minimized.

According to an embodiment, the aperture stop S may be positioned closer to the object O than the first lens L1, and a portion (e.g., a middle portion passing through the optical axis A) of the surface (e.g., 'S1' of FIG. 6) on the side of the object of the first lens L1 may protrude toward the object O, beyond the aperture stop S. For example, the middle portion of the surface (e.g., 'S1' of FIG. 6) on the side of the object of the first lens L1 may be positioned closer to the object O than the aperture stop S, and the periphery portion (e.g., a portion around the middle portion of the surface on the side of the object) of the first lens L1 may be positioned closer to the image sensor I than the aperture stop S. According to an embodiment, in designing the lens assembly, as the aperture stop S is moved away from the surface S1 of the first lens L1, the amount of light received at the periphery of the first lens L1 may be reduced. For example, as the aperture stop S moves away from the surface S1 along the direction of the optical axis A toward the object, the amount of light passing through the aperture stop S and formed around the lens may be reduced, and the light may concentrate around the optical axis A. This way, the amount of light at the periphery of the lens L1 may decrease. According to an embodiment, if the amount of light at the periphery reduces, the quantity of light at the edge of the image obtained by the image sensor may be reduced, or the resolution of the lens assembly 300 may be lowered. According to an embodiment, the lens assembly 300 may minimize the light transmission area (e.g., the opening area 105 or 205 of FIG. 1 or 3) of the display and secure a good resolution by meeting Equation 1 as follows.

$$0.9 \leq StopL/TL \leq 1.3 \qquad \text{[Equation 1]}$$

Here, "StopL" may denote the distance between the image forming surface (e.g., the image forming surface IS of FIG. 6) of the image sensor 319 and the aperture stop S, and "TL" may denote the distance between the image forming surface of the image sensor 319 and the surface S1 of the first lens L1 on the side of the object. "TL" may also refer to the total length of the lens assembly 300. According to an embodiment, StopL and TL are measured along the optical axis A.

According to an embodiment, the barrel structure 321 may have an inner wall inclined from the aperture stop S to prevent noise light from coming in upon capturing the object. For example, the inner diameter of the barrel structure 321 may increase towards the first lens L1. According to an embodiment, at the front view of the electronic device (e.g., the electronic device 100 or 200 of FIG. 1 or 3), when the lens assembly 300 is disposed to overlap the display, if the light output from the display is directly incident to the lens assembly 300, the light may act as noise in capturing the object. According to an embodiment, part of the light incident to the lens assembly 300 and reflected, refracted, or scattered by the lenses 301 may be reflected by the inner wall of the barrel structure 321 to the image sensor 319 and act as noise. According to an embodiment, the thickness tb of the barrel structure 321, measured in the direction of the optical axis A, may range from about 0.2 mm to about 0.5 mm. The lens assembly 300 may suppress the light acting as noise by meeting Equation 2 below.

$$0.4 \leq Da/\text{HFOV} \leq 1.5 \quad \text{[Equation 2]}$$

Here, "Da" denotes the angle of inclination of the inner wall of the barrel structure 321 from the aperture stop S, and "HFOV" denotes the half field of view of the lens assembly 300, e.g., the maximum angle, from the optical axis A, of the light incident to the lens assembly 300. According to an embodiment, the inner wall of the barrel structure 321 may include a first section I1 that extends from the aperture stop S to the first lens L1 and has a first angle of inclination Da from the aperture stop S and a second section I2 that extends from an end of the first section I1 to the first lens L1. The second section I2 has a second angle of inclination Db from the aperture stop S. In the structure in which the inner wall of the barrel structure 321 includes the first section I1 and the second section I2, the lens assembly may suppress light acting as noise by meeting Equations 3 and 4 below.

$$1.0 \leq Da/Db \leq 3.0 \quad \text{[Equation 3]}$$

Here, "Da" may denote the angle of inclination, from the aperture stop S, of the inner wall of the barrel structure 321 in the first section I1, and "Db" may denote the angle of inclination, from the aperture stop S, of the inner wall of the barrel structure 321 in the second section I2. According to an embodiment, the angle of inclination Da of the first section I1 may be smaller than 90 degrees, and the angle of inclination Db of the second section may be smaller than 45 degrees.

$$0.2 \leq BTa/BTb \leq 1 \quad \text{[Equation 4]}$$

Here, "BTa" may denote the thickness of the first section I1 measured in the direction of the optical axis A, and "BTb" may denote the thickness of the second section I2 measured in the direction of the optical axis A.

According to an embodiment, the lens assembly 300 may suppress the entrance of noise light by further including a light shielding member 323. For example, the light shielding member 323 may be disposed between the aperture stop S and the first lens L1 or between the barrel structure 321 and the first lens L1, and may include an aperture corresponding to the effective diameter ED1 of, at least, the first lens L1. For example, the "effective diameter" may be defined as an area where substantially most of the external light is transmitted or light beams which may serve as a center for obtaining an image are passed in the lens. The light shielding member 323 may be formed corresponding to the size of the effective diameter where most of light beams are transmitted. According to an embodiment, the light shielding member 323 may be disposed between the barrel structure 321 and the first lens L1 to block the entrance of the light reflected in the barrel structure 321.

The amount of the light incident to the lens assembly 300 may be limited because the aperture stop S is positioned closer to the object O than the first lens L1. This allows the light transmission area (e.g., the opening area 105 or 205 of FIG. 1 or 3) to shrink. According to an embodiment, as the third lens L3 is disposed closer to the first lens L1, the effective diameter of the third lens L3 relative to the lens scale may be increased, and the image sensor 319 may receive more light. For example, although the amount of incident light is limited, the lens assembly 300 may secure a sufficient amount of light needed for obtaining an image, according to the placement of the third lens L3.

According to an embodiment, as the third lens L3 is disposed close to the first lens L1, the field-of-view depth (FOVD) may shorten, so that the lens assembly 300 may obtain a good field of view even when the aperture stop S is disposed closer to the object O than the first lens L1. The field of view may be the area of an image captured via the lens assembly. "Field-of-view depth (FOVD)" may refer to the distance between the aperture stop S and the point where the light beam reaching the maximum image height (ImgH) of the image formed on the image forming surface (e.g., the image forming surface IS of FIG. 6) meets the optical axis A. In placing the first lens L1 and the third lens L3 close to each other, the lens assembly 300 may meet Equations 5 and 6 below.

$$0.1 \leq CT15/\text{Stop}L \leq 0.4 \quad \text{[Equation 5]}$$

$$0.13 \leq CT15/TL \leq 0.35 \quad \text{[Equation 6]}$$

Here, "CT15" may denote the distance between the object-side surface S1 of the first lens L1 and the object-side surface S5 of the third lens L3, as measured along the optical axis A.

According to an embodiment, when the lens assembly 300 includes five or six lenses and meets Equation 5, the lens assembly 300 may obtain clearer or sharper images or videos by meeting Equation 7.

$$80 \leq Vd3 + Vd4 + Vd5 \leq 170 \quad \text{[Equation 7]}$$

Here, "Vd3" may denote the Abbe number of the third lens L3, "Vd4" the Abbe number of the fourth lens L4, and "Vd5" the Abbe number of the fifth lens L5. "Abbe number" refers to a quantity for specifying the light dispersion-related characteristics of the lens. The Abbe number may be varied depending on the refractive index and may be the reciprocal of the dispersion. For example, the higher the Abbe number is, the clearer image may be obtained. As the refractive index increases, the Abbe number reduces, and the dispersion increases, so that quality of the image may decrease.

According to an embodiment, in placing the first lens L1 and the third lens L3 close to each other, e.g., the first lens L1, the second lens L2, and/or the third lens L3 in the lens assembly 300 may meet Equations 8, 9, and 10 below.

$$0.15 \leq (LT1/TL) \times FNO \leq 0.38 \quad \text{[Equation 8]}$$

$$1.6 \leq LT1/LT2 \leq 3.2 \quad \text{[Equation 9]}$$

$$0.1 \leq LT1/TL \leq 0.2 \quad \text{[Equation 10]}$$

Here, "LT1" may denote the thickness of the first lens L L1 as measured along the optical axis A, "LT2" may denote the thickness of the second lens L2 as measured along the optical axis A, and "FNO" may denote the F number of the lens assembly 300.

According to an embodiment, as the third lens L3 is disposed closer to the first lens L1, the effective diameter of the third lens L3 relative to the lens scale may be increased, so that the actual size of the third lens L3 may decrease. For example, when disposed close to the first lens L1, the third lens L3, despite its small size, may contribute to securing a sufficient amount of light for image capture. According to an embodiment, as the third lens L3 is disposed close to the first lens L1, the lens assembly 300 may meet Equation 11 below.

$$0.3 \leq ED3/TL \leq 0.45 \quad \text{[Equation 11]}$$

Here, "ED3" may denote the effective diameter of the third lens L3.

According to an embodiment, as the first lens L1 and the third lens L3 are disposed close to each other, the lens assembly 300 may reduce in size and may be disposed to overlap the display and be easily disposed inside a miniaturized electronic device (e.g., the electronic device 100 of FIG. 1). According to an embodiment, as the first lens L1 and the third lens L3 are disposed close to each other, in the lens assembly 300, the FOVD may reduce, and the effective diameter of the third lens L3 relative to the lens scale may increase. For example, although the lens assembly 300 is disposed to overlap the display and captures the object via the light transmission area of the display, a sufficient amount of light may be secured. Regarding the FOVD, the lens assembly 300 may meet Equation 12 below.

$$0.1 \leq FOVD/ImgH \leq 0.2 \quad \text{[Equation 12]}$$

Here, "ImgH" may denote the maximum image height of the image formed on the image forming surface (e.g., the image forming surface IS) of the image sensor 319. "Image forming surface" may refer to where the light reflected by the object O is focused by a group of lenses, forming an image.

Various implementation examples of the lens assembly 300 are described below with reference to FIGS. 6 to 17.

Figure 6:
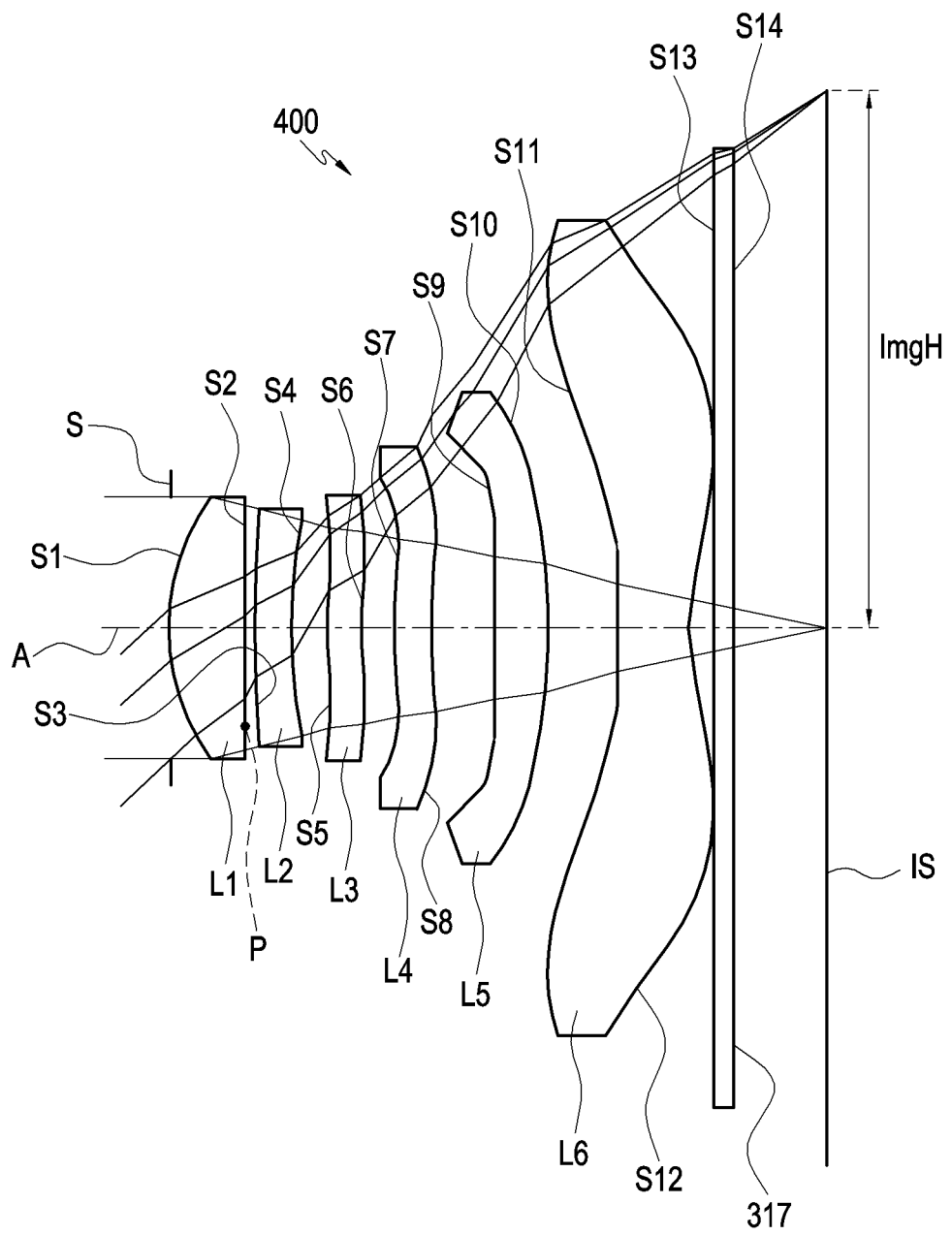
FIG. 6 is a view illustrating a configuration of a lens assembly according to an embodiment.
Figure 7:
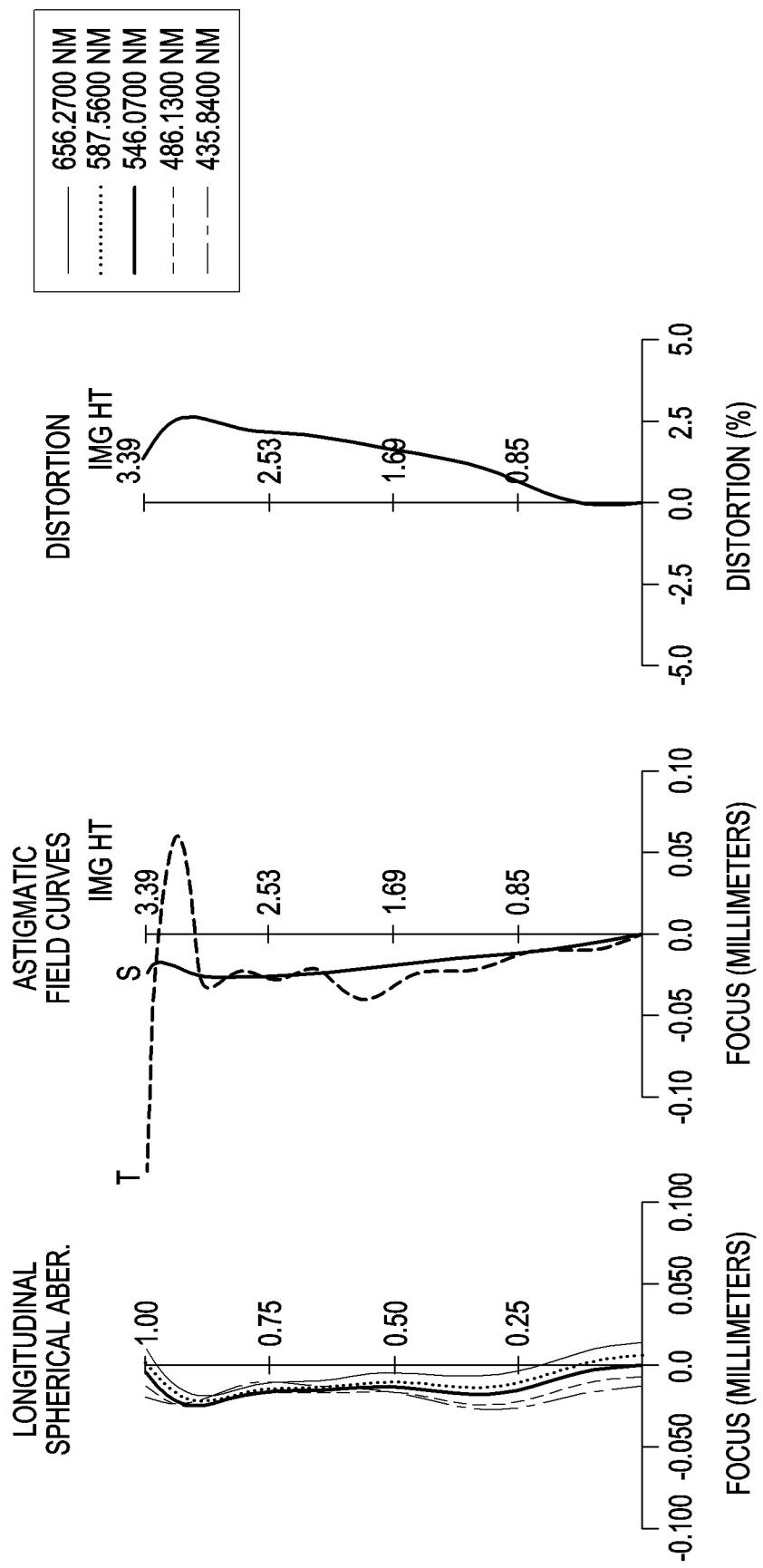
FIG. 7 is a graph illustrating the spherical aberration, astigmatism, and distortion of a lens assembly according to an embodiment.

FIG. 6 is a view illustrating a configuration of a lens assembly 400 (e.g., the camera module 206 of FIG. 3 or the lens assembly 300 of FIG. 4) according to an embodiment. FIG. 7 is a graph illustrating the spherical aberration, astigmatism, and distortion of a lens assembly 400 according to an embodiment. In FIG. 7, 'T' may denote the astigmatism of the tangential plane, 'S' the astigmatism of the sagittal plane, and 'IMG HT' the distance from the optical axis at the image forming surface.

Referring to FIGS. 6 and 7, the lens assembly 400 may meet at least one of the above-described equations and may include at least three (e.g., six) lenses L1, L2, L3, L4, L5, and L6 sequentially arranged from the object side to the image sensor side between the aperture stop S and the image sensor (e.g., the image forming surface IS). The first lens L1 of the lens assembly 400 may be disposed on the side of the object, and the surface S1 on the side of the object is convex, at least, at the optical axis A, and the surface S2 on the side of the image sensor may be concave. According to an embodiment, the first lens L1 may be an aspherical lens and have positive refractive power. According to an embodiment, the first lens L1 may have an inflection point P on the image sensor-side surface S2, and the distance between the inflection point P and the center of the effective diameter (e.g., the optical axis A) of the first lens L1 may be 0.5 times or more of the effective diameter of the first lens L1. The second lens L2 of the lens assembly 400 may be a lens with negative refractive power, which has a convex object-side surface S3, at least, at the optical axis A and a concave image sensor-side surface S4. The third lens L3 of the lens assembly 400 may have positive or negative refractive power and be disposed in a position meeting at least one of the above-described equations.

The focal length, F-number, TFOV, and total length of the lens assembly 400 may be 3.72 mm, 2.2, 40.5 degrees, and 4.3 mm, respectively. The lens data of the lens assembly 400 are set forth in Table 1 below, and the aspheric coefficients of the lenses L1, L2, L3, L4, L5, and L6 are set forth in Tables 2 and 3.

TABLE 1

|  | Radius of curvature | thickness or air gap | Refractive index | Abbe number | focal length |
| --- | --- | --- | --- | --- | --- |
| aperture stop | infinity | 0.01 |  |  |  |
| S1 | 1.330676 | 0.452662 | 1.5441 | 56.09 | 2.9797 |
| S2 | 6.40343 | 0.077512 |  |  |  |
| S3 | 54.18877 | 0.22 | 1.67074 | 19.20 | −7.4797 |
| S4 | 4.635214 | 0.243167 |  |  |  |
| S5 | 5.357702 | 0.22 | 1.5441 | 56.09 | −56.4023 |
| S6 | 4.498111 | 0.196191 |  |  |  |
| S7 | 3.112989 | 0.23 | 1.61554 | 25.80 | 139.697 |
| S8 | 3.137418 | 0.401788 |  |  |  |
| S9 | 11.24402 | 0.34 | 1.5441 | 56.09 | 4.9492 |
| S10 | −3.52339 | 0.429523 |  |  |  |
| S11 | 4.566798 | 0.457116 | 1.5441 | 56.90 | −3.2146 |
| S12 | 1.223854 | 0.163917 |  |  |  |
| S13 | infinity | 0.11 | 1.5168 | 64.20 |  |
| S14 | infinity | 0.615428 |  |  |  |
| image forming surface | infinity | −0.0173 |  |  |  |

TABLE 2

|  | S1 | S2 | S3 | S4 | S5 | S6 |
| --- | --- | --- | --- | --- | --- | --- |
| K | 0.2718731 | −64.3653 | −99 | 11.138991 | 0 | −22.2969 |
| A | −0.030584 | −0.09226 | −0.03468 | 0.0121742 | −0.16203 | −0.21608 |
| B | 0.1586033 | 0.613926 | 0.474361 | 0.529444 | 0.25309 | 0.550133 |
| C | −2.4028 | −6.05422 | −3.4567 | −3.447807 | −2.65925 | −1.80541 |
| D | 14.623303 | 33.24254 | 20.89331 | 19.718134 | 14.38035 | −0.12215 |
| E | −51.1234 | −110.999 | −76.1917 | −72.42618 | −50.9439 | 17.46621 |

TABLE 2-continued

|   | S1 | S2 | S3 | S4 | S5 | S6 |
|---|---|---|---|---|---|---|
| F | 104.45369 | 227.1754 | 169.0268 | 170.23131 | 114.3803 | −57.3984 |
| G | −124.1474 | −277.336 | −220.965 | −245.1594 | −157.218 | 88.57715 |
| H | 78.96474 | 184.4715 | 156.1159 | 197.88771 | 120.6552 | −68.8109 |
| J | −20.76276 | −51.3573 | −45.9944 | −68.50858 | −38.7952 | 21.85035 |

TABLE 3

|   | S7 | S8 | S9 | S10 | S11 | S12 |
|---|---|---|---|---|---|---|
| K | −11.1581 | 0 | 0 | −1.36946 | −12.4088 | −7.78504 |
| A | −0.37403 | −0.39245 | −0.02566 | −0.00306 | −0.51638 | −0.18893 |
| B | 0.601716 | 0.342132 | −0.47316 | −0.13363 | 0.502026 | 0.143235 |
| C | −0.66396 | 0.6527 | 2.244715 | 0.85897 | −0.28763 | −0.08006 |
| D | −0.99286 | −5.03356 | −5.44254 | −1.56067 | 0.10876 | 0.029724 |
| E | 2.799484 | 12.52712 | 7.552373 | 1.344252 | −0.02756 | −0.00695 |
| F | 0.65927 | −16.9805 | −6.58186 | −0.63689 | 0.004638 | 0.000937 |
| G | −8.73078 | 13.21525 | 3.512681 | 0.170286 | −0.0005 | −5.84E−05 |
| H | 10.21115 | −5.49611 | −1.02885 | −0.02396 | 3.12E−05 | −4.92E−09 |
| J | −3.79175 | 0.942299 | 0.125267 | 0.001361 | −8.67E−07 | 1.21E−07 |

Figure 8:
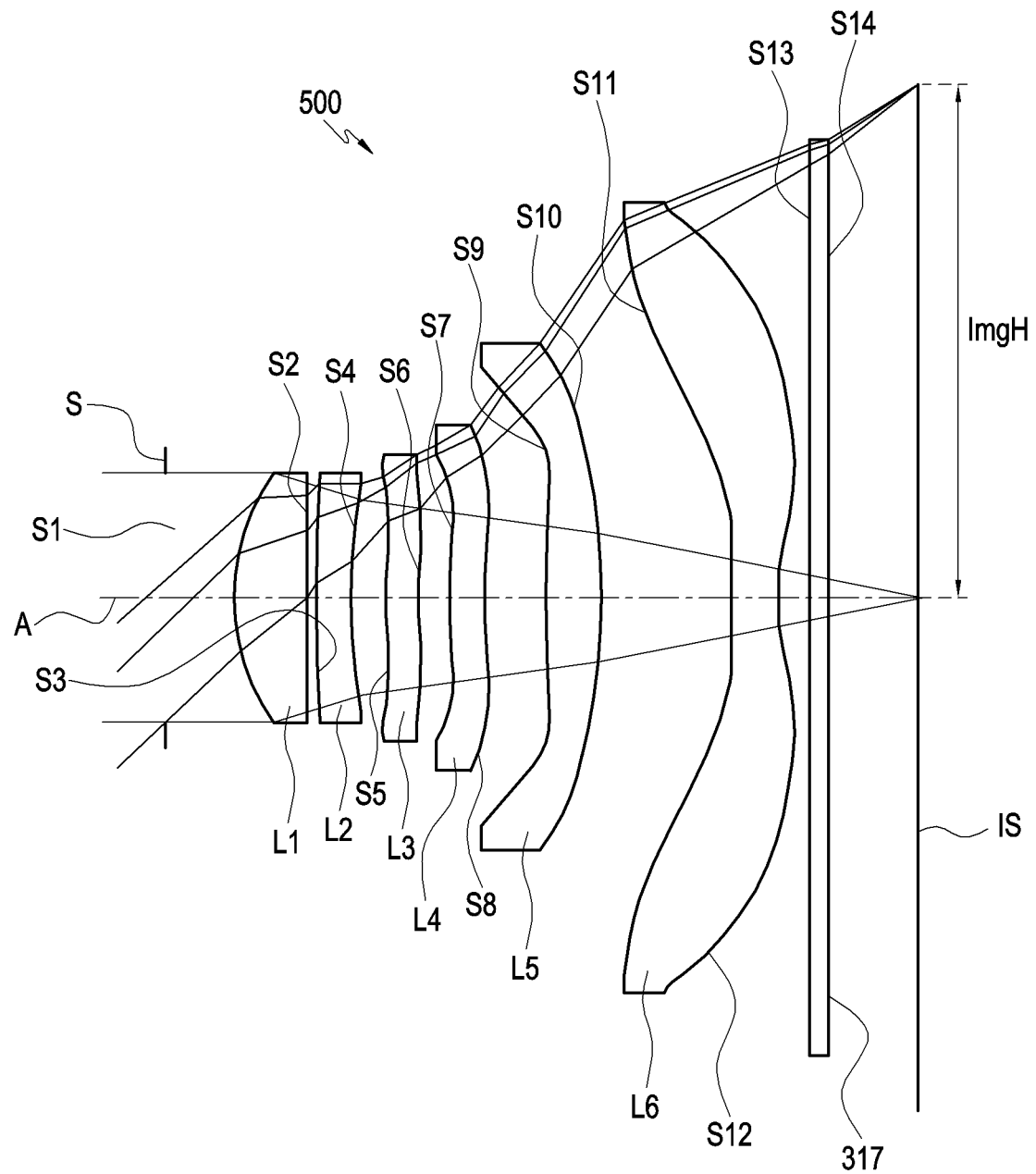
FIG. 8 is a view illustrating a configuration of a lens assembly according to an embodiment.
Figure 9:
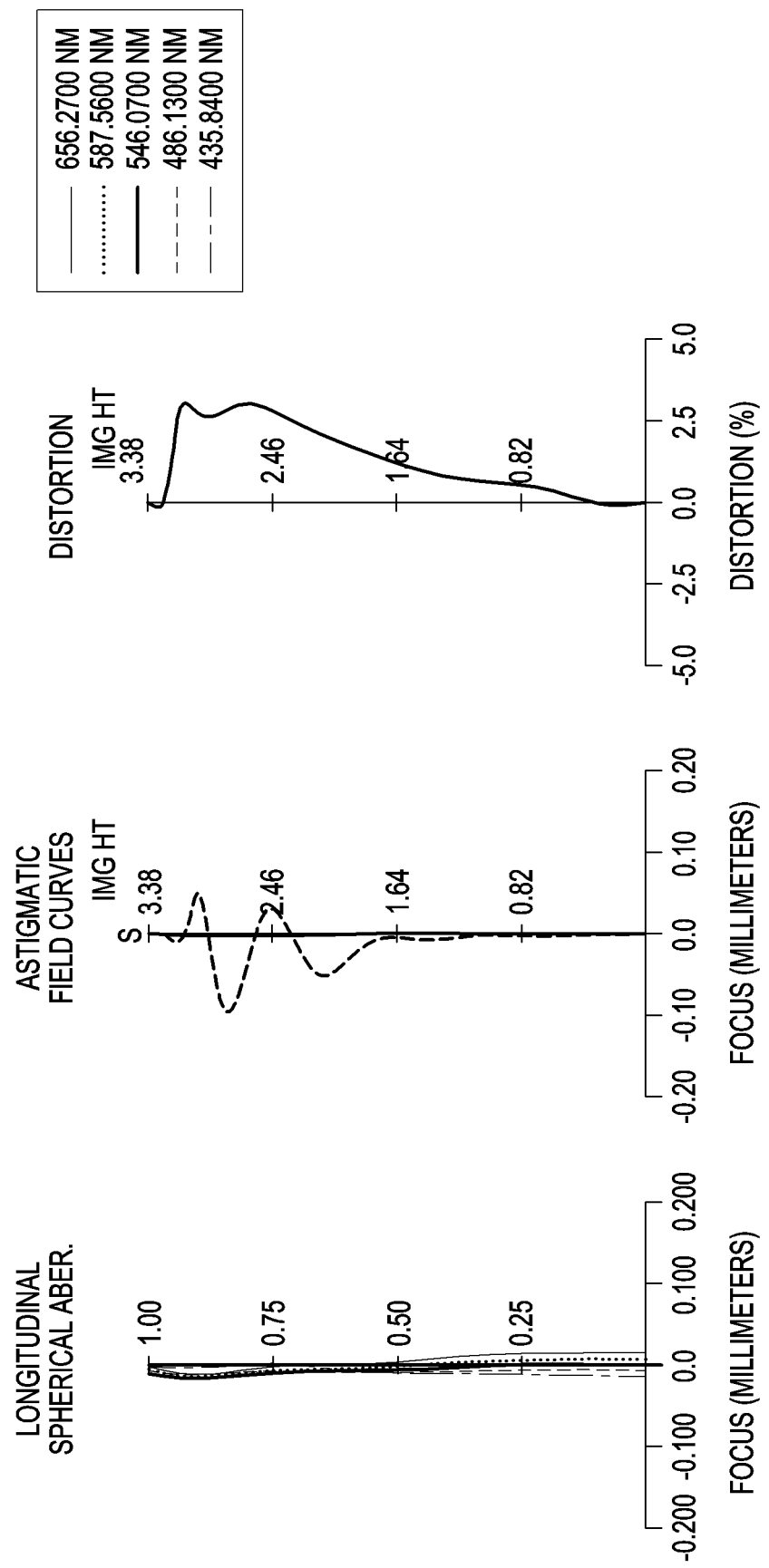
FIG. 9 is a graph illustrating the spherical aberration, astigmatism, and distortion of a lens assembly according to an embodiment.

FIG. 8 is a view illustrating a configuration of a lens assembly 500 (e.g., the camera module 206 of FIG. 3 or the lens assembly 300 of FIG. 4) according to an embodiment. FIG. 9 is a graph illustrating the spherical aberration, astigmatism, and distortion of a lens assembly 500 according to an embodiment.

Referring to FIGS. 8 and 9, the lenses of the lens assembly 500 may have a similar shape to those in the embodiments described above, and meet at least one of the above-described equations. The focal length, F-number, THFOV, and total length of the lens assembly 500 may be 3.8 mm, 2.4, 38.29 degrees, and 4.3 mm, respectively. The lens data of the lens assembly 500 are set forth in Table 4 below, and the aspheric coefficients of the lenses are set forth in Tables 5 and 6.

TABLE 4

|   | Radius of curvature | thickness or air gap | Refractive index | Abbe number | focal length |
|---|---|---|---|---|---|
| aperture stop | infinity | 0.725847 |  |  |  |
| S1 | 1.343954 | 0.500125 | 1.544100 | 60.00 | 2.9914 |
| S2 | 6.56092 | 0.089914 |  |  |  |
| S3 | −350.037 | 0.220001 | 1.673700 | 20.00 | −7.633 |
| S4 | 5.26116 | 0.218608 |  |  |  |
| S5 | 5.232203 | 0.220404 | 1.5348 | 55.71 | −26.9313 |
| S6 | 3.785773 | 0.163998 |  |  |  |
| S7 | 3.17023 | 0.220364 | 1.67266 | 19.20 | −121.55 |
| S8 | 2.967296 | 0.38286 |  |  |  |
| S9 | 6.553577 | 0.31518 | 1.53544 | 55.70 | 4.6947 |
| S10 | −4.03722 | 0.826781 |  |  |  |
| S11 | 12.70509 | 0.27918 | 1.5441 | 56.09 | −2.9786 |
| S12 | 1.431747 | 0.163917 |  |  |  |
| S13 | infinity | 0.11 | 1.5168 | 64.20 |  |
| S14 | infinity | 0.438116 |  |  |  |
| image forming surface | infinity | −0.00945 |  |  |  |

TABLE 5

|   | S1 | S2 | S3 | S4 | S5 | S6 |
|---|---|---|---|---|---|---|
| K | 0.320323 | −69.4507 | 160185.3 | 3.581506 | 0 | −0.9717 |
| A | −0.03111 | −0.06618 | −0.02321 | 0.027784 | −0.14526 | −0.14516 |
| B | 0.055353 | 0.182296 | 0.24574 | 0.378442 | 0.157149 | −0.46842 |
| C | −0.6975 | −2.22205 | −1.94097 | −2.8432 | −1.52693 | 6.144409 |
| D | 3.724033 | 13.02542 | 12.0113 | 16.89755 | 7.562953 | −32.734 |
| E | −13.3603 | −46.6092 | −42.0446 | −60.1169 | −28.2144 | 94.66313 |
| F | 28.84932 | 101.4589 | 88.59152 | 134.2185 | 70.64378 | −163.508 |
| G | −37.0732 | −130.479 | −109.448 | −182.999 | −107.493 | 169.0924 |
| H | 25.96609 | 90.32053 | 72.47986 | 140.2789 | 88.80859 | −97.1243 |
| J | −7.80333 | −25.9044 | −19.7844 | −46.3259 | −29.966 | 24.04349 |

TABLE 6

|   | S7 | S8 | S9 | S10 | S11 | S12 |
|---|---|---|---|---|---|---|
| K | −8.01525 | 0 | 0 | −2.67065 | −25.2234 | −10.7709 |
| A | −0.31106 | −0.36125 | −0.00724 | 0.098891 | −0.47114 | −0.20812 |
| B | −0.12306 | 0.042896 | −0.45039 | −0.35016 | 0.436892 | 0.150863 |
| C | 3.90122 | 1.810018 | 1.40306 | 0.936587 | −0.23837 | −0.07708 |
| D | −16.8096 | −6.8147 | −2.47258 | −1.35167 | 0.085477 | 0.027984 |
| E | 36.82877 | 12.59725 | 2.532067 | 1.071306 | −0.02041 | −0.00734 |
| F | −47.491 | −13.6012 | −1.65723 | −0.49419 | 0.003205 | 0.001348 |
| G | 36.30361 | 8.710677 | 0.688279 | 0.133341 | −0.00032 | −1.63E−04 |
| H | −15.2778 | −3.0499 | −0.16129 | −0.0196 | 1.81E−05 | 1.14E−05 |
| J | 2.744677 | 0.447105 | 0.015836 | 1.21E−03 | −4.49E−07 | −3.51E−07 |

Figure 10:
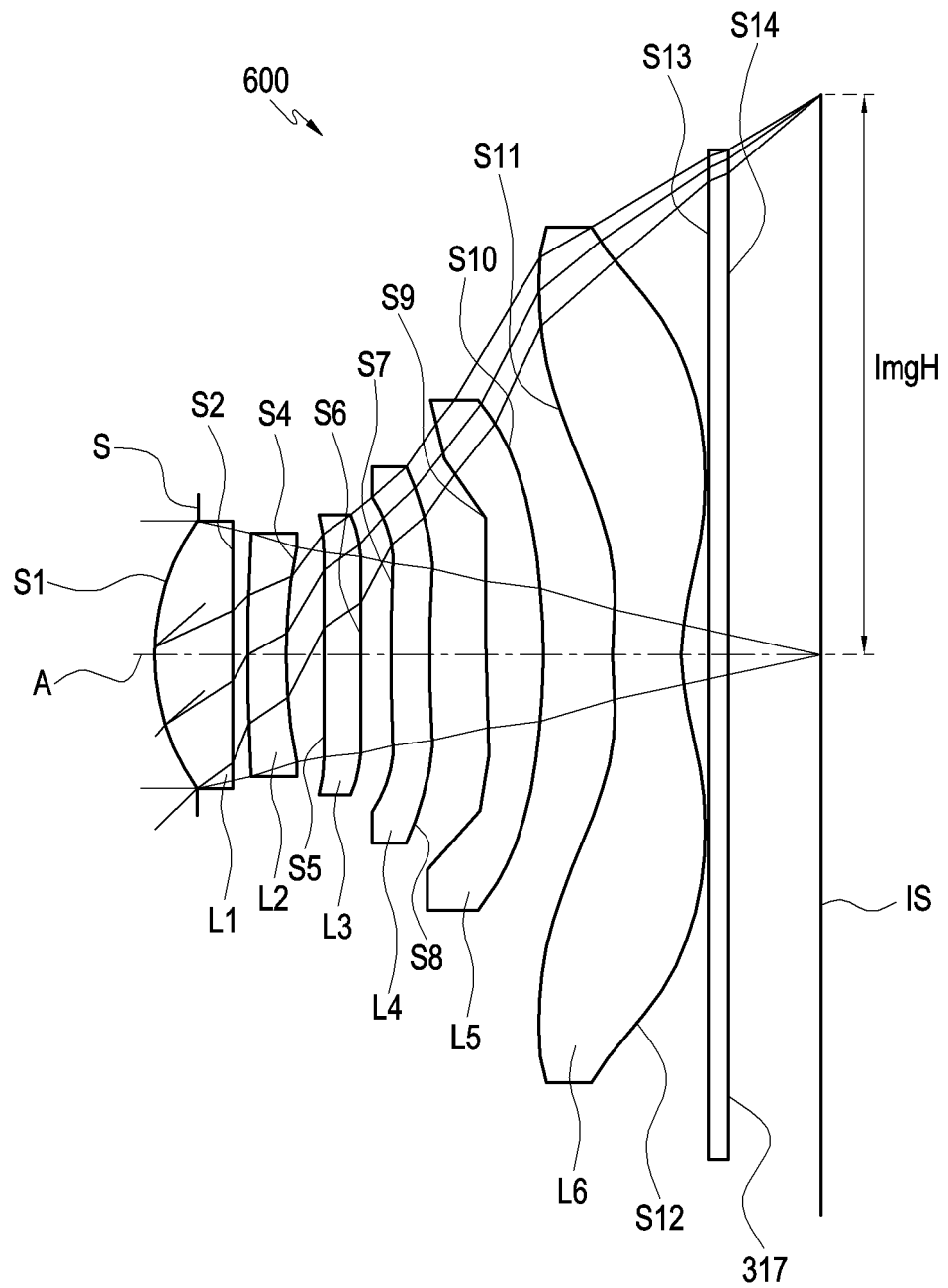
FIG. 10 is a view illustrating a configuration of a lens assembly according to an embodiment.
Figure 11:
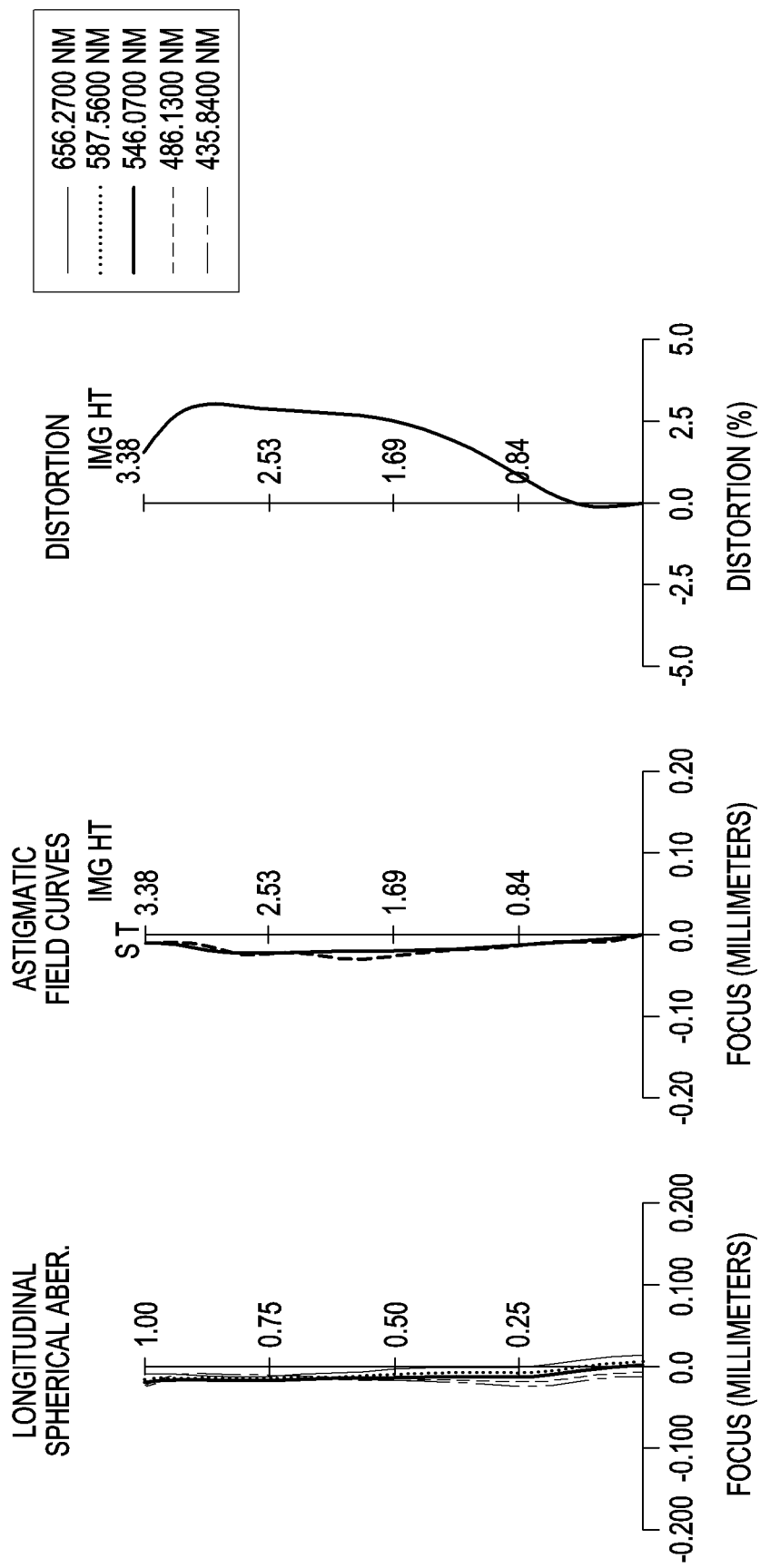
FIG. 11 is a graph illustrating the spherical aberration, astigmatism, and distortion of a lens assembly according to an embodiment.

FIG. 10 is a view illustrating a configuration of a lens assembly 600 (e.g., the camera module 206 of FIG. 3 or the lens assembly 300 of FIG. 4) according to an embodiment. FIG. 11 is a graph illustrating the spherical aberration, astigmatism, and distortion of a lens assembly 600 according to an embodiment.

Referring to FIGS. 10 and 11, the lenses of the lens assembly 600 may have a similar shape to those in the embodiments described above, and meet at least one of the above-described equations. The focal length, F-number, THFOV, and total length of the lens assembly 600 may be 3.72 mm, 2.2, 41.45 degrees, and 4.3 mm, respectively. The lens data of the lens assembly 600 are set forth in Table 7 below, and the aspheric coefficients of the lenses are set forth in Tables 8 and 9.

TABLE 7

|   | Radius of curvature | thickness or air gap | Refractive index | Abbe number | focal length |
|---|---|---|---|---|---|
| aperture stop | infinity | −0.3 | | | |
| S1 | 1.330915 | 0.458914 | 1.5441 | 56.10 | 2.9352 |
| S2 | 6.868278 | 0.112636 | | | |
| S3 | −1220.16 | 0.232121 | 1.673700 | 20.00 | −6.9749 |
| S4 | 4.77527 | 0.233009 | | | |
| S5 | 7.19958 | 0.231522 | 1.573473 | 30.00 | 285.3623 |
| S6 | 7.439906 | 0.200274 | | | |
| S7 | 4.455973 | 0.228817 | 1.615043.3 | 30.00 | −160.874 |
| S8 | 4.181731 | 0.366346 | | | |
| S9 | 15.88683 | 0.342777 | 1.562248 | 40.00 | 4.8477 |
| S10 | −3.28636 | 0.440021 | | | |
| S11 | 5.347922 | 0.431842 | 1.534899 | 60.00 | −3.0889 |
| S12 | 1.230676 | 0.163917 | | | |
| S13 | infinity | 0.11 | 1.5168 | 64.20 | |
| S14 | infinity | 0.607211 | | | |
| image forming surface | infinity | −0.01941 | | | |

TABLE 8

|   | S1 | S2 | S3 | S4 | S5 | S6 |
|---|---|---|---|---|---|---|
| K | 0.28811 | −59.7623 | 2343135 | 13.01666 | 0 | −40.916 |
| A | −0.01938 | −0.07207 | −0.01422 | 0.018433 | −0.16341 | −0.21944 |
| B | −0.15797 | 0.233834 | −0.06171 | 0.345429 | 0.275862 | 0.511411 |
| C | 0.965588 | −2.68264 | 2.186334 | −1.76018 | −2.36952 | −2.45546 |
| F | −4.30095 | 16.59144 | −12.449 | 12.5507 | 12.78738 | 7.318858 |
| R | 10.3449 | −63.0104 | 42.62649 | −58.4321 | −49.0987 | −15.3907 |
| F | −13.9205 | 148.0574 | −90.5795 | 172.5533 | 122.7046 | 20.09314 |
| G | 8.319303 | −210.608 | 117.3575 | −307.997 | −187.915 | −14.0717 |
| H | 0.173658 | 166.3553 | −84.2107 | 303.604 | 158.7951 | 2.996975 |
| J | −1.69954 | −56.0859 | 25.3468 | −126.225 | −55.5485 | 1.243885 |

TABLE 9

|   | S7 | S8 | S9 | S10 | S11 | S12 |
|---|---|---|---|---|---|---|
| K | −16.2411 | 0 | 0 | −2.00891 | −13.7014 | −8.24379 |
| A | −0.36054 | −0.35901 | −0.02061 | 0.013775 | −0.52618 | −0.18749 |
| B | 0.498617 | 0.295972 | −0.29738 | −0.05812 | 0.514995 | 0.137804 |
| C | −1.11337 | −0.12692 | 1.134393 | 0.391129 | −0.29608 | −0.06833 |
| F | 2.990449 | −0.60332 | −2.68824 | −0.69195 | 0.111876 | 0.021144 |
| R | −8.27063 | 1.647166 | 3.764241 | 0.539235 | −0.02818 | −0.00391 |
| F | 15.51107 | −2.13474 | −3.392 | −0.21754 | 0.004677 | 0.000364 |

TABLE 9-continued

|   | S7 | S8 | S9 | S10 | S11 | S12 |
|---|---|---|---|---|---|---|
| G | −17.6054 | 1.608392 | 1.873072 | 0.045572 | −0.00049 | −2.75E−06 |
| H | 10.85869 | −0.64941 | −0.55871 | −0.00421 | 2.97E−05 | −2.27E−06 |
| J | −2.76991 | 0.106307 | 0.067978 | 7.25E−05 | −7.87E−07 | 1.30E−07 |

Figure 12:
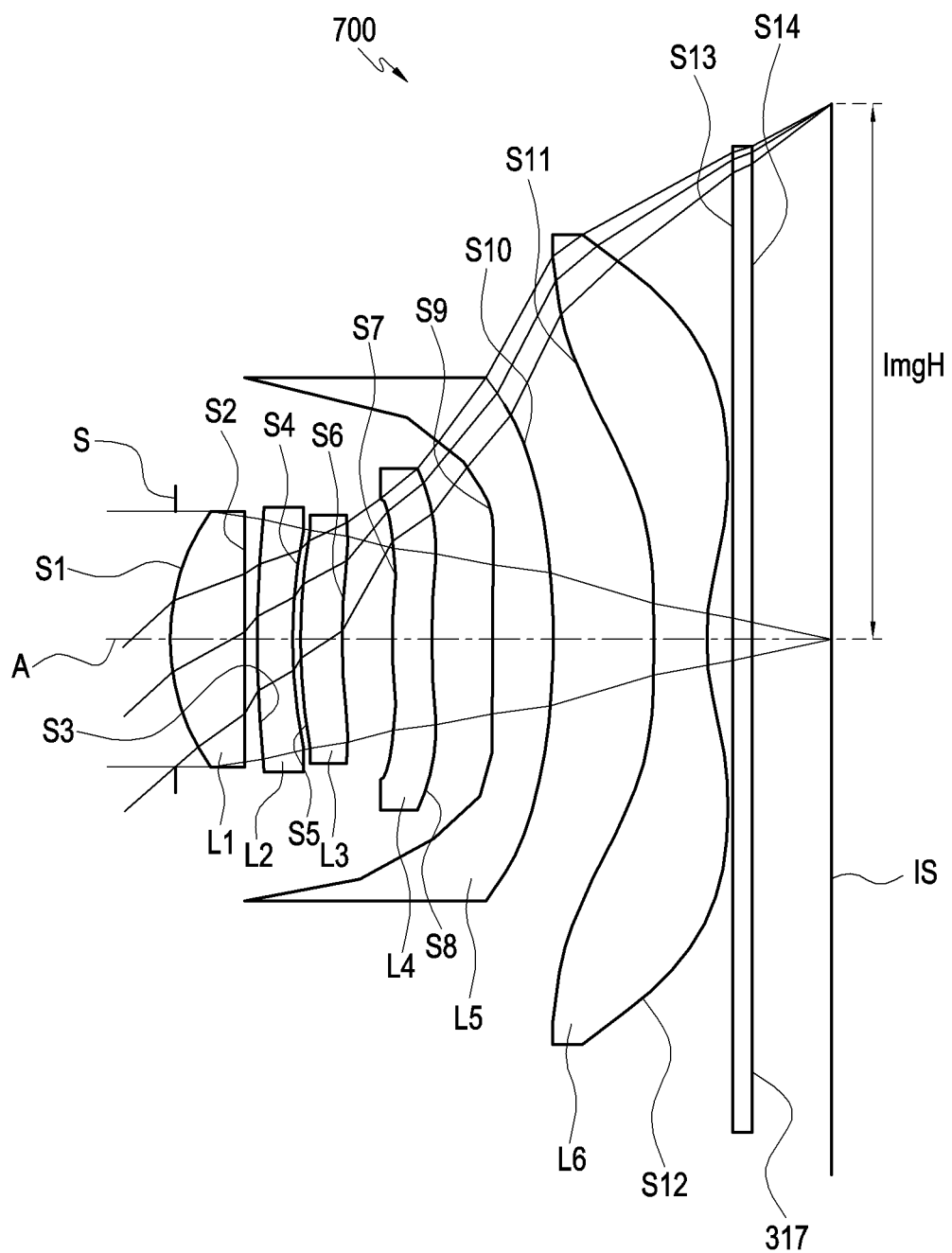
FIG. 12 is a view illustrating a configuration of a lens assembly according to an embodiment.
Figure 13:
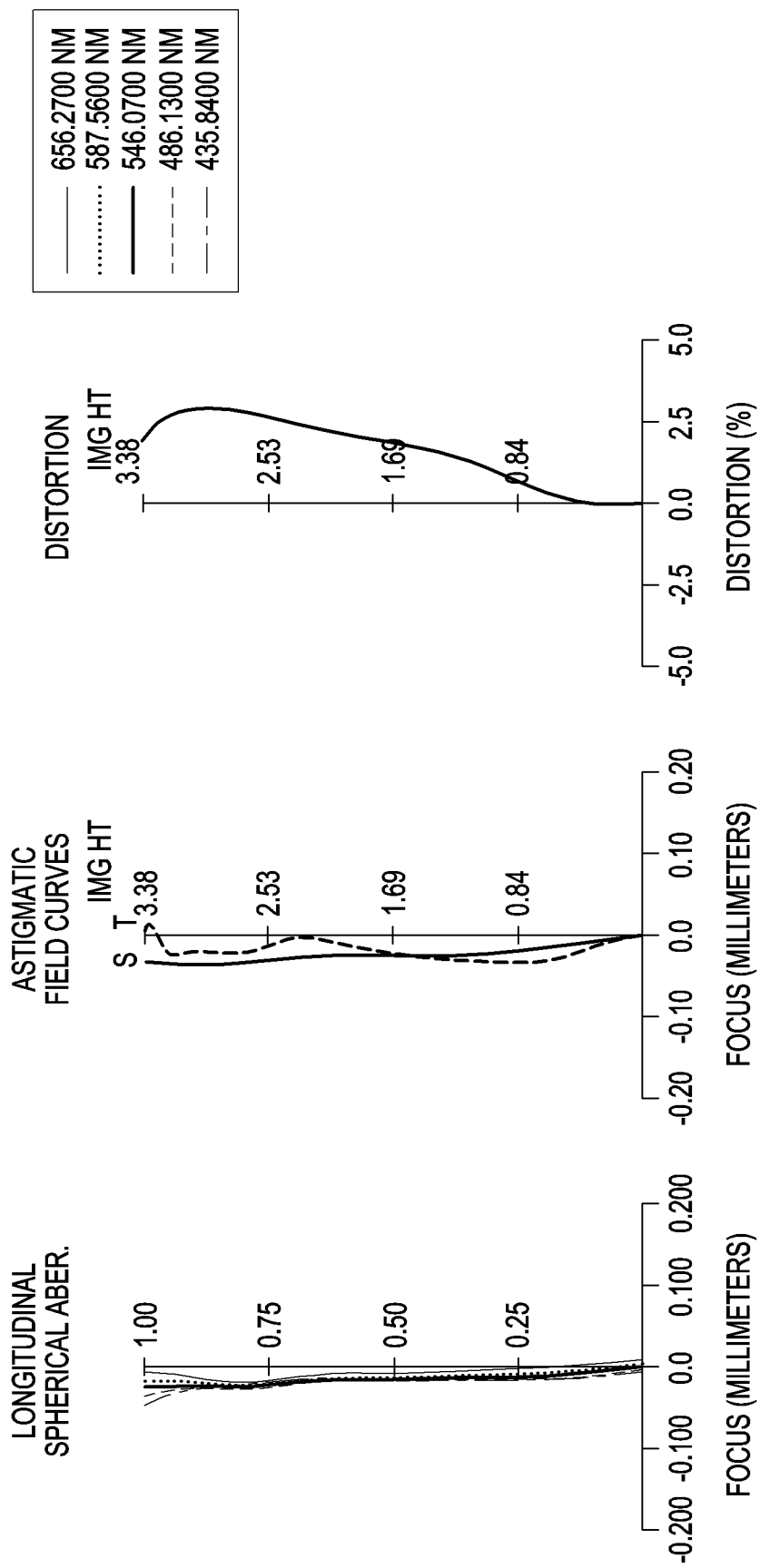
FIG. 13 is a graph illustrating the spherical aberration, astigmatism, and distortion of a lens assembly according to an embodiment.

FIG. 12 is a view illustrating a configuration of a lens assembly 700 (e.g., the camera module 206 of FIG. 3 or the lens assembly 300 of FIG. 4) according to an embodiment. FIG. 13 is a graph illustrating the spherical aberration, astigmatism, and distortion of a lens assembly 700 according to an embodiment.

Referring to FIGS. 12 and 13, the lenses of the lens assembly 700 may have a similar shape to those in the embodiments described above, and meet at least one of the above-described equations. The focal length, F-number, FOV, nd total length of the lens assembly 700 may be 3.72 mm, 2.3, 41.3 degrees, and 4.3 mm, respectively. The lens data of the lens assembly 700 are set forth in Table 10 below, and the aspheric coefficients of the lenses are set forth in Tables 11 and 12.

TABLE 10

|   | Radius of curvature | thickness or air gap | Refractive index | Abbe number | focal length |
|---|---|---|---|---|---|
| aperture stop | infinity | 0.01 | | | |
| S1 | 1.393236 | 0.430008 | 1.543419 | 56.00 | 3.2497 |
| S2 | 5.790468 | 0.093584 | | | |
| S3 | −35.5454 | 0.22 | 1.6737 | 19.25 | −6.6512 |
| S4 | 5.211779 | 0.056408 | | | |
| S5 | 2.712531 | 0.262959 | 1.5348 | 55.71 | 16.3865 |
| S6 | 3.788197 | 0.313234 | | | |
| S7 | 3.995982 | 0.253656 | 1.6517 | 21.05 | −32.1096 |
| S8 | 3.276464 | 0.36976 | | | |
| S9 | 11.85175 | 0.394183 | 1.56695 | 38.90 | 4.6876 |
| S10 | −3.41111 | 0.617187 | | | |
| S11 | 5.044616 | 0.342514 | 1.544 | 56.09 | −2.9135 |
| S12 | 1.180894 | 0.163917 | | | |
| S13 | infinity | 0.11 | 1.5168 | 64.20 | |
| S14 | infinity | 0.535214 | | | |
| image forming surface | infinity | −0.02262 | | | |

TABLE 11

|   | S1 | S2 | S3 | S4 | S5 | S6 |
|---|---|---|---|---|---|---|
| K | 0.235015 | −52.4247 | −63747.3 | 2.555346 | 0 | −0.02496 |
| A | −0.03188 | 0.020207 | −0.01813 | 0.06168 | −0.15658 | −0.1982 |
| B | −0.03008 | −0.86227 | 0.492168 | −0.10168 | 0.072893 | 0.745507 |
| c | −0.00349 | 5.648059 | −3.00692 | 1.371333 | −0.00896 | −4.08818 |
| F | 0.017759 | −26.5314 | 10.52515 | −8.443 | −0.46144 | 14.96808 |
| R | −2.31571 | 80.16935 | −16.3889 | 33.32483 | −5.39838 | −37.9773 |
| F | 9.813711 | −150.779 | 3.556482 | −73.7559 | 34.49258 | 61.71119 |
| G | −18.47 | 170.4288 | 25.41529 | 90.72314 | −77.2988 | −60.0533 |
| H | 16.39443 | −105.874 | −34.3127 | −56.3813 | 78.62065 | 30.93488 |
| J | −5.59001 | 27.64729 | 13.98995 | 12.98974 | −30.1179 | −6.14122 |

TABLE 12

|   | S7 | S8 | S9 | S10 | S11 | S12 |
|---|---|---|---|---|---|---|
| K | −10.8622 | 0 | 0 | −3.59962 | −73.3368 | −7.46483 |
| A | −0.32438 | −0.34695 | −0.00434 | 0.07233 | −0.46765 | −0.23035 |
| B | 0.05247 | 0.003868 | −0.40753 | −0.21805 | 0.422785 | 0.193798 |
| C | 1.75126 | 1.426768 | 1.220656 | 0.545686 | −0.22035 | −0.11367 |
| F | −8.20597 | −5.26058 | −2.38813 | −0.76231 | 0.074038 | 0.045587 |
| R | 19.14172 | 10.19875 | 2.823213 | 0.576953 | −0.01628 | −0.01259 |
| F | −26.175 | −11.8469 | −2.15687 | −0.24901 | 0.00231 | 0.002355 |
| G | 20.15711 | 8.179371 | 1.02266 | 0.061252 | −0.0002 | −2.85E−04 |
| H | −7.45326 | −3.04993 | −0.26479 | −0.00791 | 9.76E−06 | 2.03E−05 |
| J | 0.709284 | 0.468771 | 0.028013 | 4.06E−04 | −1.95E−07 | −6.36E−07 |

Figure 14:
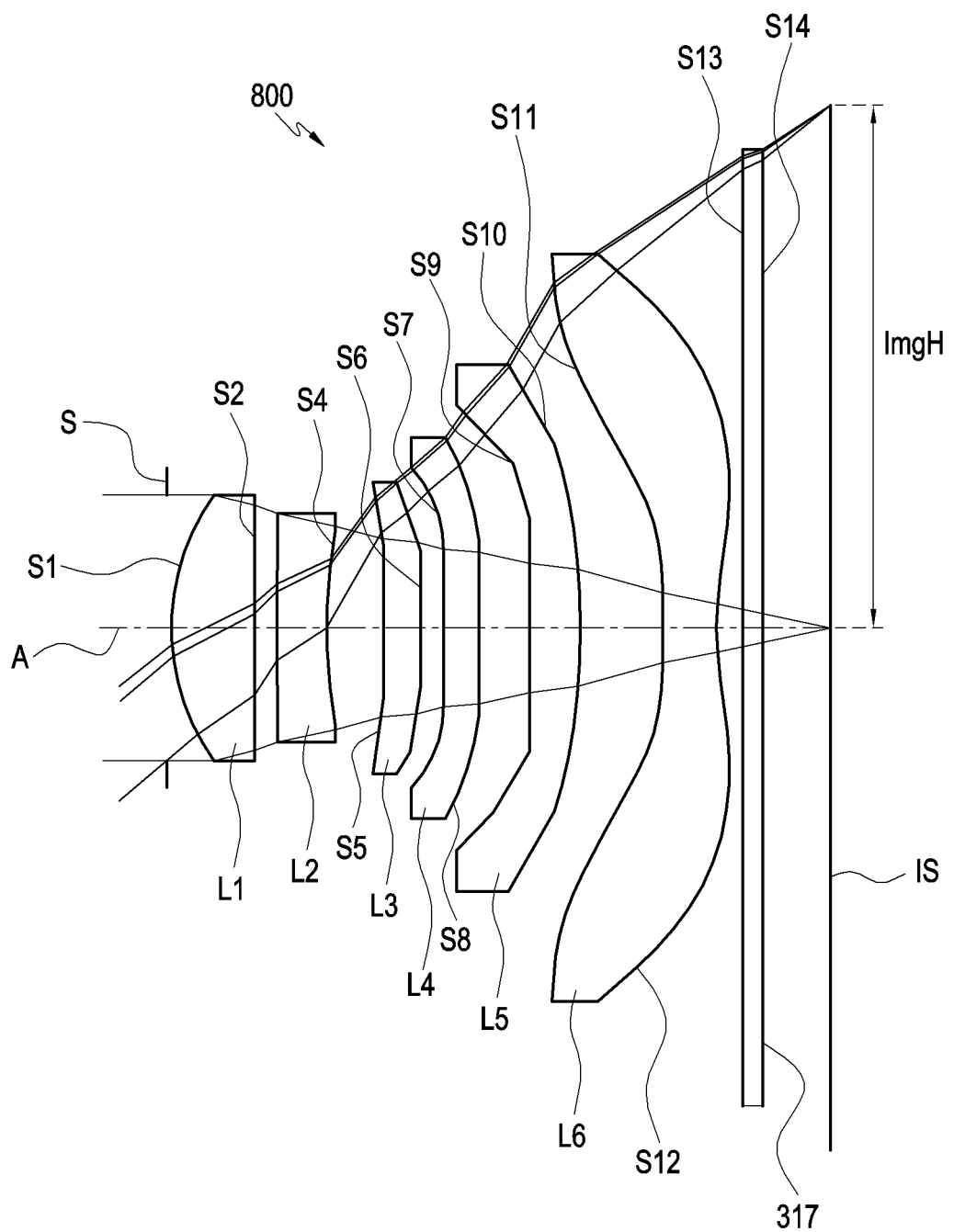
FIG. 14 is a view illustrating a configuration of a lens assembly according to an embodiment.
Figure 15:
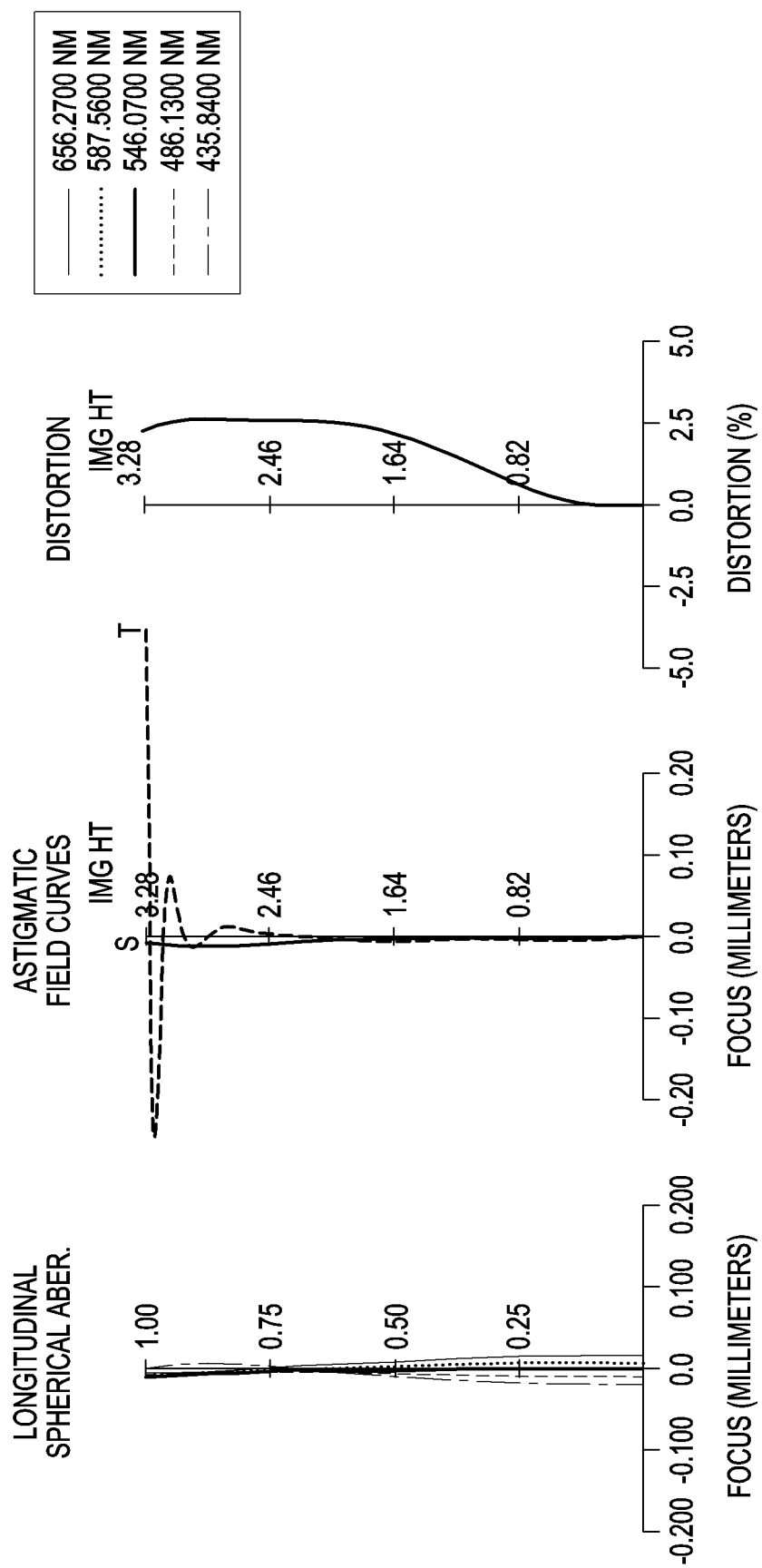
FIG. 15 is a graph illustrating the spherical aberration, astigmatism, and distortion of a lens assembly according to an embodiment.

FIG. 14 is a view illustrating a configuration of a lens assembly 800 (e.g., the camera module 206 of FIG. 3 or the lens assembly 300 of FIG. 4) according to an embodiment. FIG. 15 is a graph illustrating the spherical aberration, astigmatism, and distortion of a lens assembly 800 according to an embodiment.

Referring to FIGS. 14 and 15, the lenses of the lens assembly 800 may have a similar shape to those in the embodiments described above, and meet at least one of the above-described equations. The focal length, F-number, THFOV, and total length of the lens assembly 800 may be 3.8 mm, 2.3, 39.7 degrees, and 4.3 mm, respectively. The lens data of the lens assembly 800 are set forth in Table 13 below, and the aspheric coefficients of the lenses are set forth in Tables 14 and 15.

Figure 16:
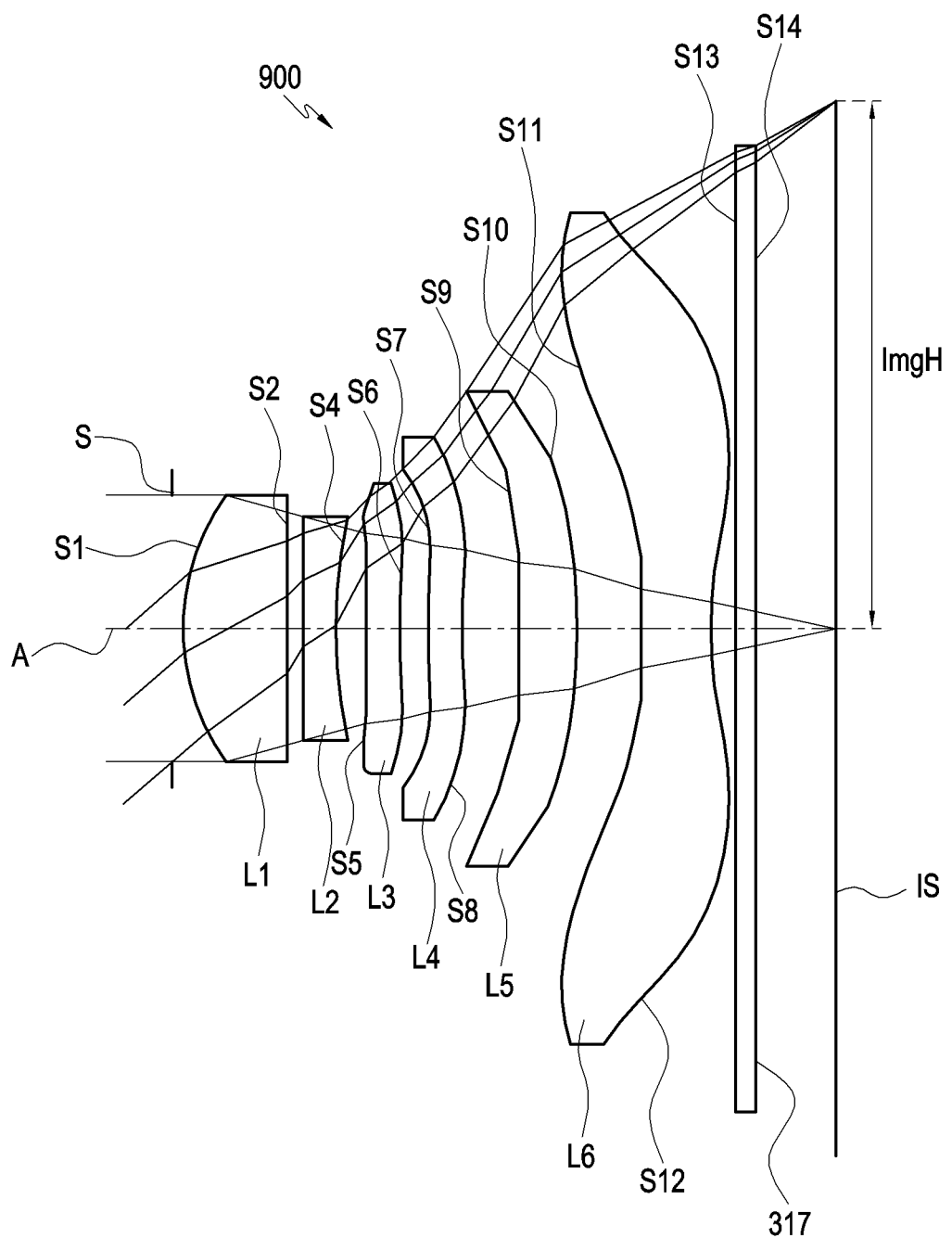
FIG. 16 is a view illustrating a configuration of a lens assembly according to an embodiment.
Figure 17:
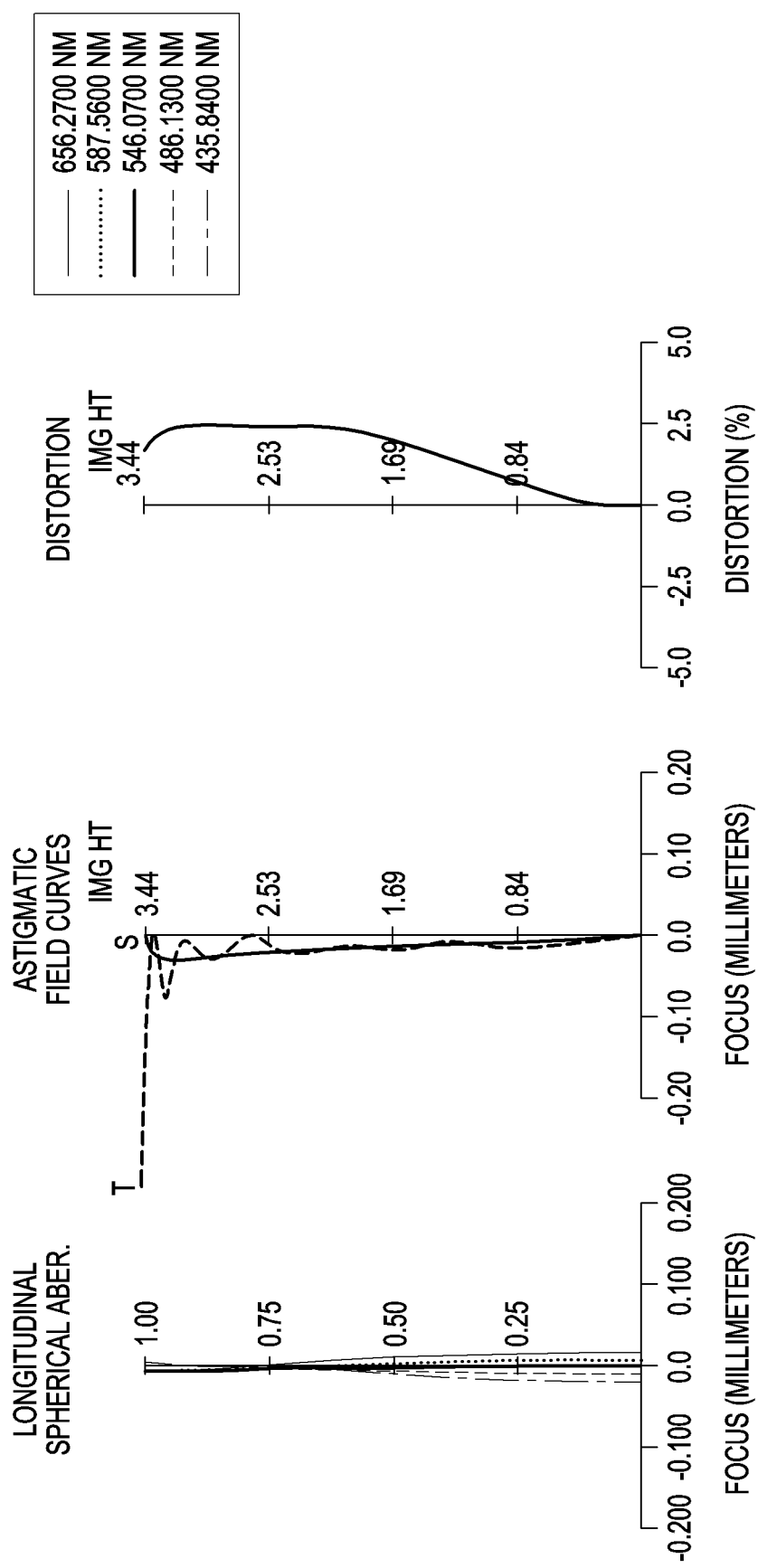
FIG. 17 is a graph illustrating the spherical aberration, astigmatism, and distortion of a lens assembly according to an embodiment.

FIG. 16 is a view illustrating a configuration of lens assembly 900 (e.g., the camera module 206 of FIG. 3 or the lens assembly 300 of FIG. 4) according to an embodiment. FIG. 17 is a graph illustrating the spherical aberration, astigmatism, and distortion of a lens assembly 900 according to an embodiment.

Referring to FIGS. 16 and 17, the lenses of the lens assembly 900 may have a similar shape to those in the embodiments described above, and meet at least one of the above-described equations. The focal length, F-number, THFOV, and total length of the lens assembly 900 may be 3.72 mm, 2.2, 40 degrees, and 4.3 mm, respectively. The lens data of the lens assembly 900 are set forth in Table 4 below, and the aspheric coefficients of the lenses are set forth in Tables 5 and 6.

TABLE 13

|  | Radius of curvature | thickness or air gap | Refractive index | Abbe number | focal length |
|---|---|---|---|---|---|
| aperture stop | infinity | 0.01 | | | |
| S1 | 1.336561 | 0.544296 | 1.5441 | 56.09 | 2.8794 |
| S2 | 7.603372 | 0.120526 | | | |
| S3 | −485.973 | 0.313817 | 1.6737 | 19.25 | −7.9767 |
| S4 | 5.502457 | 0.361361 | | | |
| S5 | 19.58728 | 0.22 | 1.59294 | 31.10 | −1400.88 |
| S6 | 19.05897 | 0.146213 | | | |
| S7 | 7.714621 | 0.22 | 1.66917 | 19.70 | −43.1725 |
| S8 | 6.033614 | 0.32176 | | | |
| S9 | 16.48896 | 0.314722 | 1.59572 | 28.70 | 5.0123 |
| S10 | −3.65652 | 0.510038 | | | |
| S11 | 19.39117 | 0.337765 | 1.57913 | 33.90 | −2.5781 |
| S12 | 1.38632 | 0.163917 | | | |
| S13 | infinity | 0.11 | 1.5168 | 64.20 | |
| S14 | infinity | 0.461456 | | | |
| image forming surface | infinity | −0.00587 | | | |

TABLE 14

|  | S1 | S2 | S3 | S4 | S5 | S6 |
|---|---|---|---|---|---|---|
| K | 0.275786 | −128.797 | 308411.9 | 16.10365 | 0 | −223.237 |
| A | −0.03012 | −0.07671 | −0.0593 | 0.027754 | −0.14943 | −0.21448 |
| B | −0.05064 | 0.095016 | 0.201743 | 0.230328 | 0.329266 | 0.547116 |
| C | 0.100984 | −1.64779 | −0.77579 | −1.15763 | −3.22588 | −3.00292 |
| F | −0.64169 | 11.31482 | 5.833689 | 11.32151 | 16.10163 | 9.628789 |
| R | 2.079722 | −45.0208 | −24.0941 | −57.9712 | −52.209 | −21.5841 |
| F | −5.46804 | 108.6562 | 60.25096 | 175.841 | 108.9093 | 31.36806 |
| G | 9.383538 | −156.36 | −90.4071 | −312.77 | −140.519 | −27.7478 |
| H | −9.04894 | 122.7601 | 74.63873 | 302.1114 | 101.2685 | 13.02908 |
| J | 3.572005 | −40.4083 | −26.0263 | −121.939 | −30.6638 | −2.20486 |

TABLE 15

|  | S7 | S8 | S9 | S10 | S11 | S12 |
|---|---|---|---|---|---|---|
| K | −16.9935 | 0 | 0 | −1.44658 | −12.6817 | −11.6076 |
| A | −0.36296 | −0.33197 | 0.025831 | 0.091009 | −0.60506 | −0.27909 |
| B | 0.523631 | 0.19182 | −0.44791 | −0.25576 | 0.639085 | 0.254791 |
| C | −1.06775 | 0.212233 | 1.194608 | 0.580848 | −0.39897 | −0.15675 |
| F | 2.205786 | −1.2082 | −2.28378 | −0.78058 | 0.16435 | 0.064452 |
| R | −5.40201 | 2.251611 | 2.816209 | 0.572669 | −0.04521 | −0.01813 |
| F | 9.962776 | −2.43684 | −2.32788 | −0.23928 | 0.008203 | 0.003458 |
| G | −11.63 | 1.615869 | 1.211492 | 0.057145 | −0.00094 | −4.30E−04 |
| H | 7.579889 | −0.59089 | −0.34583 | −0.00725 | 6.23E−05 | 3.15E−05 |
| J | −2.05963 | 0.089055 | 0.040595 | 3.78E−04 | −1.81E−06 | −1.03E−06 |

TABLE 16

|  | Radius of curvature | thickness or air gap | Refractive index | Abbe number | focal length |
|---|---|---|---|---|---|
| aperture stop | infinity | 0.05 | | | |
| S1 | 1.321362 | 0.67 | 1.53480 | 55.70 | 2.8789 |
| S2 | 7.475721 | 0.086021 | | | |
| S3 | −154.924 | 0.22 | 1.673700 | 19.00 | −7.4177 |
| S4 | 5.23194 | 0.191037 | | | |
| S5 | 8.098586 | 0.22 | 1.578840 | 35.00 | −144.891 |
| S6 | 7.315847 | 0.177354 | | | |
| S7 | 4.994218 | 0.22 | 1.666880 | 20.00 | −67.5797 |
| S8 | 4.421345 | 0.356435 | | | |
| S9 | 27.70634 | 0.365392 | 1.573473 | 34.00 | 4.8378 |
| S10 | −3.11341 | 0.408212 | | | |
| S11 | 6.742765 | 0.43094 | 1.561012 | 43.00 | −2.9039 |
| S12 | 1.287515 | 0.163917 | | | |
| S13 | infinity | 0.11 | 1.5168 | 64.20 | |
| S14 | infinity | 0.532104 | | | |
| image forming surface | infinity | −0.01141 | | | |

TABLE 17

|  | S1 | S2 | S3 | S4 | S5 | S6 |
|---|---|---|---|---|---|---|
| K | 0.338366 | −133.835 | 34322.16 | 15.15978 | 0 | −9.71242 |
| A | −0.03991 | −0.05896 | −0.00666 | 0.018187 | −0.15183 | −0.25724 |
| B | 0.15959 | −0.10514 | −0.22376 | 0.706236 | 0.260685 | 1.133936 |
| C | −1.72278 | 0.457152 | 3.270724 | −6.12638 | −1.00628 | −6.45889 |
| F | 9.057013 | −2.17748 | −18.096 | 40.27656 | −0.38702 | 25.00653 |
| R | −29.4911 | 5.674432 | 61.05474 | −162.041 | 11.4841 | −68.1649 |
| F | 58.69981 | −5.80581 | −126.71 | 404.7229 | −36.8861 | 123.6174 |
| G | −69.8603 | −3.76251 | 157.5877 | −611.294 | 57.71821 | −140.855 |
| H | 45.39037 | 12.49465 | −107.024 | 512.8349 | −47.7736 | 90.52122 |
| J | −12.3759 | −7.24024 | 30.19362 | −183.212 | 17.90181 | −24.746 |

TABLE 18

|  | S7 | S8 | S9 | S10 | S11 | S12 |
|---|---|---|---|---|---|---|
| K | −26.9009 | 0 | 0 | −0.34052 | −12.6343 | −8.87091 |
| A | −0.44148 | −0.38495 | −0.00897 | 0.033948 | −0.50749 | −0.19946 |
| B | 1.167911 | 0.384628 | −0.44499 | −0.17565 | 0.485365 | 0.157673 |
| C | −4.69193 | −0.08906 | 1.679375 | 0.603678 | −0.2719 | −0.09113 |
| F | 15.99747 | −1.35277 | −3.80928 | −0.89123 | 0.099907 | 0.03596 |
| R | −40.159 | 3.387263 | 5.246093 | 0.638313 | −0.02443 | −0.00949 |
| F | 66.41345 | −4.2188 | −4.70746 | −0.23897 | 0.003928 | 0.001617 |
| G | −67.8007 | 3.089619 | 2.618244 | 0.044437 | −0.0004 | −1.69E−04 |
| H | 38.59817 | −1.2414 | −0.7957 | −0.00289 | 2.32E−05 | 9.79E−06 |
| J | −9.33112 | 0.207453 | 0.099645 | −9.11E−05 | −5.89E−07 | −2.40E−07 |

As described above, according to an embodiment, a lens assembly (e.g., the camera module 206 of FIG. 3 or the lens assembly 300 or 400 of FIG. 4 or 6) or an electronic device (e.g., the electronic device 100 or 200 of FIG. 1 or 3) including the lens assembly comprises an aperture stop (e.g., the aperture stop S of FIG. 4 or 6) and at least three lenses (e.g., the first to third lenses L1, L2, and L3 of FIG. 4 or 6) sequentially arranged from a side of an object to a side of an image sensor along an optical axis (e.g., the optical axis A of FIG. 4 or 6). A first lens disposed on the side of the object among the at least three lenses is disposed closer to the image sensor than the aperture stop, the first lens including a convex surface (e.g., the surface S1 of FIG. 6) on the side of the object and a concave surface (e.g., the surface S2 of FIG. 6) on the side of the image sensor, and the first lens having positive refractive power. A second lens among the at least three lenses is disposed closer to the image sensor than the first lens, the second lens includes a convex surface (e.g., the surface S3 of FIG. 6) on the side of the object and a concave surface (e.g., the surface S4 of FIG. 6) on the side of the image sensor, and the second lens having negative refractive power. A third lens among the at least three lenses is disposed closer to the image sensor than the second lens and has positive or negative refractive power. The lens assembly meets Equation 1:

$$0.1 = < CT15/StopL = < 0.4 \qquad \text{Equation 1}$$

where "CT15" denotes a distance between the object-side convex surface of the first lens and the object-side convex surface of the third lens measured along the optical axis, and "StopL" denotes a distance between an image forming surface (e.g., the image forming surface IS of FIG. 6) of the image sensor and the aperture stop measured along the optical axis.

According to an embodiment, the lens assembly or the electronic device including the same may further comprise a fourth lens, a fifth lens, and a sixth lens (e.g., the fourth to sixth lenses L4, L5, and L6 of FIG. 3 or 6) sequentially arranged from the side of the object to the side of the image sensor between the third lens and the image forming surface of the image sensor.

According to an embodiment, the lens assembly or the electronic device including the same may meet Equation 2:

$$80 =< Vd3+Vd4+Vd5 =< 170 \quad \text{Equation 2}$$

where "Vd3" denotes an Abbe number of the third lens, "Vd4" denotes an Abbe number of the fourth lens, and "Vd5" denotes an Abbe number of the fifth lens.

According to an embodiment, the lens assembly or the electronic device including the same may meet Equation 3:

$$0.9 =< StopL/TL =< 1.3 \quad \text{Equation 3}$$

where "TL" denotes a distance between the image forming surface of the image sensor and the object-side convex surface of the first lens measured along the optical axis.

According to an embodiment, the lens assembly or the electronic device including the same may meet Equation 4:

$$0.1 =< FOVD/ImgH =< 0.2 \quad \text{Equation 4}$$

where "ImgH" denotes a maximum image height of an image formed on the image forming surface, and "FOVD" denotes a distance between the aperture stop and a point where light formed at the maximum image height meets the optical axis.

According to an embodiment, the lens assembly or the electronic device including the same may meet Equation 5:

$$0.15 =< (LT1/TL)*FNO =< 0.38 \quad \text{Equation 5}$$

where "LT1" denotes a thickness of the first lens measured along the optical axis, "TL" denotes a distance between the image forming surface of the image sensor and the object-side convex surface of the first lens measured along the optical axis, and "FNO" denotes an F number.

According to an embodiment, the lens assembly or the electronic device including the same may meet Equation 6:

$$0.13 =< CT15/TL =< 0.35 \quad \text{Equation 6}$$

where "TL" denotes a distance between the image forming surface of the image sensor and the object-side convex surface of the first lens measured along the optical axis.

According to an embodiment, the image sensor-side surface concave of the first lens may include at least one inflection point (e.g., the inflection point P of FIG. 6), and a distance between the inflection point and a center of an effective diameter of the first lens may be 0.5 times or more of the effective diameter of the first lens.

According to an embodiment, the lens assembly or the electronic device including the same may meet Equation 7:

$$1.6 =< LT1/LT2 =< 3.2 \quad \text{Equation 7}$$

where "LT1" denotes a thickness of the first lens measured along the optical axis, and "LT2" denotes a thickness of the second lens measured along the optical axis.

According to an embodiment, the lens assembly or the electronic device including the same may meet Equation 8:

$$0.1 =< LT1/TL =< 0.2 \quad \text{Equation 8}$$

where "LT1" denotes a thickness of the first lens measured along the optical axis, and "TL" denotes a distance between the image forming surface of the image sensor and the object-side convex surface of the first lens measured along the optical axis.

According to an embodiment, the lens assembly or the electronic device including the same may meet Equation 9:

$$0.3 =< ED3/TL =< 0.45 \quad \text{Equation 9}$$

where "ED3" denotes an effective diameter of the third lens, and "TL" denotes a distance between the image forming surface of the image sensor and the object-side convex surface of the first lens measured along the optical axis.

According to an embodiment, the lens assembly or the electronic device including the same may further comprise a barrel structure (e.g., the barrel structure 321 of FIG. 3) disposed between the aperture stop and the first lens. As an inner wall of the barrel structure extends from the aperture stop and is inclined from the aperture stop, an inner diameter of the barrel structure may gradually increase towards the first lens. The lens assembly may meet Equation 10:

$$0.4 =< Da/HFOV =< 1.5 \quad \text{Equation 10}$$

where "Da" denotes an angle of inclination (e.g., the angle of inclination Da of FIG. 5), from the aperture stop, of the inner wall of the barrel structure, and "HFOV" denotes a half field of view of the lens assembly.

According to an embodiment, the lens assembly or the electronic device including the same may further comprise a barrel structure disposed between the aperture stop and the first lens. An inner wall of the barrel structure may be formed to be inclined so that an inner diameter of the barrel structure gradually increases towards the first lens and may include a first section (e.g., the first section I1 of FIG. 5), which extends from the aperture stop to the first lens and has a first angle of inclination (e.g., the angle of inclination Da of FIG. 5) from the aperture stop, and a second section (e.g., the second section 2 of FIG. 5), which extends from an end of the first section to the first lens and has a second angle of inclination (e.g., the angle of inclination Db of FIG. 5) from the aperture stop. The lens assembly may meet Equation 11:

$$1.0 =< Da/Db =< 3.0 \quad \text{Equation 11}$$

where "Da" denotes the first angle of inclination, and "Db" denotes the second angle of inclination.

According to an embodiment, the lens assembly or the electronic device including the same may meet Equation 12:

$$0.2 =< BTa/BTb =< 1 \quad \text{Equation 12}$$

where "BTa" denotes a thickness of the first section measured along the optical axis, and "BTb" denotes a thickness of the second section measured along the optical axis.

According to an embodiment, a lens assembly or an electronic device including the lens assembly comprises an aperture stop and at least three lenses sequentially arranged from a side of an object to a side of an image sensor along an optical axis. A first lens disposed on the side of the object among the at least three lenses is disposed closer to the image sensor than the aperture stop, the first lens including a convex surface on the side of the object and a concave surface on the side of the image sensor, and the first lens having positive refractive power. A second lens among the at least three lenses is disposed closer to the image sensor than the first lens, the second lens includes a convex surface on the side of the object and a concave surface on the side of the image sensor, and the second lens having negative refractive power. A third lens among the at least three lenses is disposed closer to the image sensor than the second lens and has positive or negative refractive power. The lens assembly meets Equation 13:

$$0.3 =< ED3/TL =< 0.45 \quad \text{Equation 13}$$

where "ED3" denotes an effective diameter of the third lens, and "TL" denotes a distance between an image forming surface of the image sensor and the object-side convex surface of the first lens measured along the optical axis.

According to an embodiment, the lens assembly or the electronic device including the same may further comprise a fourth lens, a fifth lens, and a sixth lens sequentially arranged from the side of the object to the side of the image sensor between the third lens and the image forming surface of the image sensor.

According to an embodiment, the lens assembly or the electronic device including the same may meet Equation 14:

$$80 = < Vd3 + Vd4 + Vd5 = < 170 \qquad \text{Equation 14}$$

where "Vd3" denotes an Abbe number of the third lens, "Vd4" denotes an Abbe number of the fourth lens, and "Vd5" denotes an Abbe number of the fifth lens.

According to an embodiment, the lens assembly or the electronic device including the same may meet Equation 15:

$$0.13 = < CT15/TL = < 0.35 \qquad \text{Equation 15}$$

where "CT15" denotes a distance between the object-side convex surface of the first lens and the object-side convex surface of the third lens measured along the optical axis.

According to an embodiment, the lens assembly or the electronic device including the same may meet Equation 16:

$$0.1 = < FOVD/ImgH = < 0.2 \qquad \text{Equation 16}$$

where "ImgH" denotes a maximum image height of an image formed on the image forming surface, and "FOVD" denotes a distance between the aperture stop and a point where light formed at the maximum image height meets the optical axis.

According to an embodiment, an electronic device comprises a display including a light transmission area surrounded by an active area as viewed from above a front surface of the electronic device and the above-described lens assembly disposed to at least partially overlap the display. The lens assembly is configured to generate an image signal based on light incident via the light transmission area.

As is apparent from the foregoing description, according to certain embodiments of the disclosure, the aperture stop may be disposed on the side of the object, and the lenses may be disposed between the aperture stop and the image sensor. Thus, the area where the lens(es) is exposed to the outside may be reduced. For example, as the opening area where light is incident is reduced, the designer may be freer to design the outer appearance of the electronic device. According to an embodiment, as the opening area where light is incident is reduced, the active area of the display relative to the area of the front surface of the electronic device may be increased when the lens assembly is disposed on the front surface of the electronic device. According to an embodiment, the interval between the first lens and the third lens relative to the distance (or total length (TL)) between the aperture stop and the image forming surface may be reduced, allowing the lens assembly to reduce in size. According to an embodiment, the reduced interval between the first lens and the third lens may increase the effective diameter of the third lens relative to the lens scale. For example, although the opening area where light is incident is reduced, a sufficient amount of light may be obtained using the third lens, thereby allowing a better quality of image to be obtained.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A lens assembly, comprising:
   an aperture stop and at least three lenses sequentially arranged from a side of an object to a side of an image sensor along an optical axis,
   wherein a first lens disposed on the side of the object among the at least three lenses is disposed closer to the image sensor than the aperture stop, the first lens including a convex surface on the side of the object and a concave surface on the side of the image sensor, and the first lens having positive refractive power,
   wherein a second lens among the at least three lenses is disposed closer to the image sensor than the first lens, the second lens including a convex surface on the side of the object and a concave surface on the side of the image sensor, and the second lens having negative refractive power,
   wherein a third lens among the at least three lenses is disposed closer to the image sensor than the second lens and has positive or negative refractive power,
   wherein the lens assembly meets Equation 1:

$$0.1 = < CT15/StopL = < 0.4 \qquad \text{Equation 1,}$$

wherein "CT15" denotes a distance between the object-side convex surface of the first lens and an object-side convex surface of the third lens measured along the optical axis, and "StopL" denotes a distance between an image forming surface of the image sensor and the aperture stop measured along the optical axis,
   wherein the lens assembly further comprises a barrel structure disposed between the aperture stop and the first lens,
   wherein an inner wall of the barrel structure is formed to be inclined so that an inner diameter of the barrel structure gradually increases towards the first lens and includes a first section, which extends from the aperture stop to the first lens and has a first angle of inclination from the aperture stop, and a second section, which extends from an end of the first section to the first lens and has a second angle of inclination from the aperture stop,
   wherein the lens assembly meets Equation 2:

$$1.0 = < Da/Db = < 3.0 \qquad \text{Equation 2}$$

wherein "Da" denotes the first angle of inclination, and "Db" denotes the second angle of inclination.

2. The lens assembly of claim 1, further comprising a fourth lens, a fifth lens, and a sixth lens sequentially arranged from the side of the object to the side of the image sensor between the third lens and the image forming surface of the image sensor.

3. The lens assembly of claim 2, wherein the lens assembly meets Equation 3:

$$80 = < Vd3 + Vd4 + Vd5 = < 170 \qquad \text{Equation 3}$$

wherein "Vd3" denotes an Abbe number of the third lens, "Vd4" denotes an Abbe number of the fourth lens, and "Vd5" denotes an Abbe number of the fifth lens.

4. The lens assembly of claim 1, wherein the lens assembly meets Equation 4:

$$0.9 = < StopL/TL = < 1.3 \qquad \text{Equation 4}$$

wherein "TL" denotes a distance between the image forming surface of the image sensor and the object-side convex surface of the first lens measured along the optical axis.

5. The lens assembly of claim 1, wherein the lens assembly meets Equation 5:

$$0.1 = <FOVD/ImgH = <0.2 \qquad \text{Equation 4}$$

wherein "ImgH" denotes a maximum image height of an image formed on the image forming surface, and "FOVD" denotes a distance between the aperture stop and a point where light formed at the maximum image height meets the optical axis.

6. The lens assembly of claim 1, wherein the lens assembly meets Equation 6:

$$0.15 = <(LT1/TL)*FNO = <0.38 \qquad \text{Equation 6}$$

wherein "LT1" denotes a thickness of the first lens measured along the optical axis, "TL" denotes a distance between the image forming surface of the image sensor and the object-side convex surface of the first lens measured along the optical axis, and "FNO" denotes an F number.

7. The lens assembly of claim 1, wherein the lens assembly meets Equation 7:

$$0.13 = <CT15/TL = <0.35 \qquad \text{Equation 7}$$

wherein "TL" denotes a distance between the image forming surface of the image sensor and the object-side convex surface of the first lens measured along the optical axis.

8. The lens assembly of claim 1, wherein the image sensor-side concave surface of the first lens includes at least one inflection point, and wherein a distance between the inflection point and a center of an effective diameter of the first lens is 0.5 times or more of the effective diameter of the first lens.

9. The lens assembly of claim 1, wherein the lens assembly meets Equation 8:

$$1.6 = <LT1/LT2 = <3.2 \qquad \text{Equation 8}$$

wherein "LT1" denotes a thickness of the first lens measured along the optical axis, and "LT2" denotes a thickness of the second lens measured along the optical axis.

10. The lens assembly of claim 1, wherein the lens assembly meets Equation 9:

$$0.1 = <LT1/TL = <0.2 \qquad \text{Equation 9}$$

wherein "LT1" denotes a thickness of the first lens measured along the optical axis, and "TL" denotes a distance between the image forming surface of the image sensor and the object-side convex surface of the first lens measured along the optical axis.

11. The lens assembly of claim 1, wherein the lens assembly meets Equation 10:

$$0.3 = <ED3/TL = <0.45 \qquad \text{Equation 10}$$

wherein "ED3" denotes an effective diameter of the third lens, and "TL" denotes a distance between the image forming surface of the image sensor and the object-side convex surface of the first lens measured along the optical axis.

12. The lens assembly of claim 1, wherein the lens assembly meets Equation 11:

$$0.4 = <Da/\text{HFOV} = <1.5 \qquad \text{Equation 11}$$

wherein "HFOV" denotes a half field of view of the lens assembly.

13. The lens assembly of claim 1, wherein the lens assembly meets Equation 12:

$$0.2 = <BTa/BTb = <1 \qquad \text{Equation 12}$$

wherein "BTa" denotes a thickness of the first section measured along the optical axis, and "BTb" denotes a thickness of the second section measured along the optical axis.

14. A lens assembly, comprising:
an aperture stop and at least three lenses sequentially arranged from a side of an object to a side of an image sensor along an optical axis,
wherein a first lens disposed on the side of the object among the at least three lenses is disposed closer to the image sensor than the aperture stop, the first lens including a convex surface on the side of the object and a concave surface on the side of the image sensor, and the first lens having positive refractive power,
wherein a second lens among the at least three lenses is disposed closer to the image sensor than the first lens, the second lens including a convex surface on the side of the object and a concave surface on the side of the image sensor, and the second lens having negative refractive power,
wherein a third lens among the at least three lenses is disposed closer to the image sensor than the second lens and has positive or negative refractive power,
wherein the lens assembly meets Equation 13:

$$0.3 = <ED3/TL = <0.45 \qquad \text{Equation 13,}$$

wherein "ED3" denotes an effective diameter of the third lens, and "TL" denotes a distance between an image forming surface of the image sensor and the object-side convex surface of the first lens measured along the optical axis,
wherein the lens assembly further comprises a barrel structure disposed between the aperture stop and the first lens,
wherein an inner wall of the barrel structure is formed to be inclined so that an inner diameter of the barrel structure gradually increases towards the first lens and includes a first section, which extends from the aperture stop to the first lens and has a first angle of inclination from the aperture stop, and a second section, which extends from an end of the first section to the first lens and has a second angle of inclination from the aperture stop,
wherein the lens assembly meets Equation 14:

$$1.0 = <Da/Db = <3.0 \qquad \text{Equation 14}$$

wherein "Da" denotes the first angle of inclination, and "Db" denotes the second angle of inclination.

15. The lens assembly of claim 14, further comprising a fourth lens, a fifth lens, and a sixth lens sequentially arranged from the side of the object to the side of the image sensor between the third lens and the image forming surface of the image sensor.

16. The lens assembly of claim 15, wherein the lens assembly meets Equation 15:

$$80 = <Vd3+Vd4+Vd5 = <170 \qquad \text{Equation 15}$$

wherein "Vd3" denotes an Abbe number of the third lens, "Vd4" denotes an Abbe number of the fourth lens, and "Vd5" denotes an Abbe number of the fifth lens.

17. The lens assembly of claim 14, wherein the lens assembly meets Equation 16:

$$0.13 = <CT15/TL = <0.35 \qquad \text{Equation 16}$$

wherein "CT15" denotes a distance between the object-side convex surface of the first lens and an object-side convex surface of the third lens measured along the optical axis.

18. The lens assembly of claim 17, wherein the lens assembly meets Equation 17:

$$0.1 =< FOVD/ImgH =< 0.2 \qquad \text{Equation 17}$$

wherein "ImgH" denotes a maximum image height of an image formed on the image forming surface, and "FOVD" denotes a distance between the aperture stop and a point where light formed at the maximum image height meets the optical axis.

19. An electronic device, comprising:
a display including a light transmission area surrounded by an active area as viewed from above a front surface of the electronic device; and
the lens assembly of claim 1, the lens assembly disposed to at least partially overlap the display,
wherein the lens assembly is configured to generate an image signal based on light incident via the light transmission area.

\* \* \* \* \*